(12) United States Patent
Yamada et al.

(10) Patent No.: US 8,405,342 B2
(45) Date of Patent: Mar. 26, 2013

(54) MOTOR

(75) Inventors: Yoji Yamada, Hamamatsu (JP); Shinji Santo, Kosai (JP); Seiya Yokoyama, Toyohashi (JP); Yoko Tateishi, Kosai (JP); Yoshiaki Takemoto, Toyohashi (JP); Shigemasa Kato, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 60 days.

(21) Appl. No.: 12/893,071

(22) Filed: Sep. 29, 2010

(65) Prior Publication Data
US 2011/0181230 A1    Jul. 28, 2011

(30) Foreign Application Priority Data

Oct. 2, 2009 (JP) .................................. 2009-230612
Nov. 26, 2009 (JP) .................................. 2009-268967

(51) Int. Cl.
*H02P 1/46* (2006.01)

(52) U.S. Cl. ........ 318/724; 318/626; 318/701; 318/727; 318/801; 318/811; 310/12.04; 310/400.27; 310/181; 310/156.43; 310/180; 702/173

(58) Field of Classification Search .................. 318/724, 318/400.29, 400.21, 801, 434, 811, 34, 685, 318/626, 701, 727; 310/114, 154.45, 156.01, 310/156.07, 156.19, 156.25, 156.43, 156.45, 310/156.48, 156.53, 156.54, 156.57, 179, 310/181, 191, 195, 198, 216.008, 49.33, 310/49.39, 90.5; 322/28; 702/173
See application file for complete search history.

(56) References Cited

U.S. PATENT DOCUMENTS

| 6,384,567 B1 * | 5/2002 | Maeda ........................... 318/801 |
| 2004/0041489 A1 * | 3/2004 | Horst et al. ................... 310/181 |
| 2006/0006757 A1 * | 1/2006 | Seguchi ........................ 310/184 |
| 2006/0022544 A1 * | 2/2006 | Kinashi ......................... 310/179 |

(Continued)

FOREIGN PATENT DOCUMENTS

| JP | 9-327139 A |   | 12/1997 |
| JP | 09327139 A | * | 12/1997 |

(Continued)

OTHER PUBLICATIONS

Abstract from U.S. Appl. No. 12/752,755, filed Apr. 1, 2010. Asmo Co., LTD. Inventor: Yoji Yamada et al.

*Primary Examiner* — Bentsu Ro
*Assistant Examiner* — Jorge Carrasquillo
(74) *Attorney, Agent, or Firm* — Marsh Fischmann & Breyfogle LLP

(57) ABSTRACT

A motor including a stator, a rotor, and a current supply unit. The stator includes a stator core, which has a plurality of teeth, and a plurality of coils, which are wound around the teeth. The rotor includes a plurality of magnets, which function as first magnetic poles, and salient poles, which function as second magnetic poles. Each of the salient poles is arranged between adjacent magnets spaced apart by a clearance from the magnets. When P represents the number of poles in the rotor and S represents the number of coils, a ratio P/S of the pole number P and the coil number S is represented by (4n−2)/3m (where n and m are integers that are greater than or equal to 2). The plurality of coils includes a plurality of coil groups including coils for three phases. The current supply unit executes a different current control for each coil groups.

4 Claims, 15 Drawing Sheets

U.S. PATENT DOCUMENTS

| | | | |
|---|---|---|---|
| 2006/0244409 A1* | 11/2006 | Takeuchi et al. | 318/811 |
| 2008/0001483 A1* | 1/2008 | Kitamura et al. | 310/12 |
| 2008/0211338 A1* | 9/2008 | Koka et al. | 310/198 |
| 2010/0133939 A1 | 6/2010 | Takemoto et al. | |
| 2010/0148612 A1 | 6/2010 | Takemoto et al. | |

FOREIGN PATENT DOCUMENTS

| | | |
|---|---|---|
| JP | 2008-125203 A | 5/2008 |

* cited by examiner

MOTOR

BACKGROUND OF THE INVENTION

The present invention relates to a motor including a rotor with a consequent-pole structure.

Known rotors of the prior art used in motors may have a consequent-pole structure. Japanese Laid-Open Patent Publication No. 9-327139 describes such a rotor. The rotor includes a rotor core, a plurality of magnets arranged in the circumferential direction of the rotor core, and a plurality of salient poles formed integrally with the rotor core. The magnets function as first magnetic poles. The salient poles function as second magnetic poles and are arranged between adjacent magnets.

In a motor of a normal structure having magnetic poles that are all formed by magnets, when there are an odd number of pole pairs formed by magnets, any magnetic pole separated by 180 degrees from one magnetic pole is a magnet. Thus, the rotor has a preferable magnetic balance. In contrast, in a motor including a rotor having the consequent-pole structure described in the above publication, the salient poles have no constraining force (induction) acting on the magnetic flux. This induces a large amount of the magnetic flux of magnets to the salient poles that have a small magnetic resistance. Thus, in a motor including a rotor having the consequent-pole structure, the rotor is magnetically imbalanced in a radial direction. This increases vibration of the motor.

SUMMARY OF THE INVENTION

It is an object of the present invention to provide a motor with improved magnetic balance to reduce vibration.

To achieve the above object, one aspect of the present invention provides a motor including a stator, a rotor, and a current supply unit. The stator includes a stator core, which has a plurality of teeth, and a plurality of coils, which are wound around the teeth. The rotor includes a rotor core, a plurality of magnets, and salient poles. The rotor core faces toward the stator. The plurality of magnets are arranged on the rotor core in a circumferential direction of the rotor core and function as first magnetic poles. The salient poles are formed integrally with the rotor core. Each of the salient poles is arranged between adjacent ones of the magnets and spaced apart by a clearance from the magnets. The salient poles function as second magnetic poles that differ from the first magnetic poles. The current supply unit supplies three-phase excitation currents to the plurality of coils to drive and rotate the rotor. When P represents the number of poles in the rotor and S represents the number of coils, a ratio P/S of the pole number P and the coil number S is represented by $(4n-2)/3m$ (where n and m are integers that are greater than or equal to 2). The plurality of coils includes a plurality of coil groups including coils for three phases. The current supply unit executes a different current control for each coil groups.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to the drawings.

Figure 1:
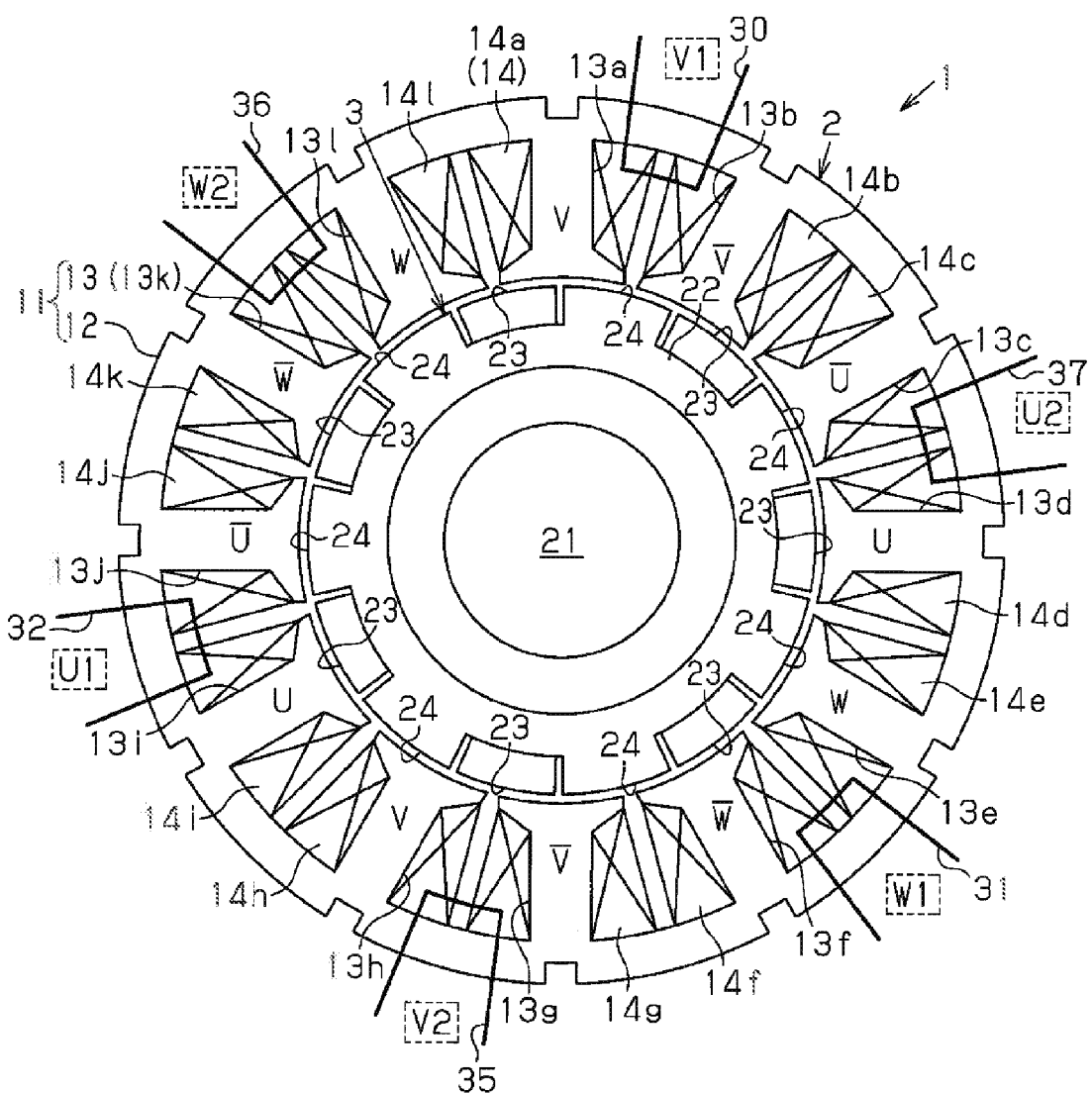
FIG. 1 is a plan view of a motor according to a first embodiment of the present invention.

As shown in FIG. 1, an inner rotor type motor 1 according to the first embodiment includes an annular stator 2 and a rotor 3 arranged inside the stator 2.

The stator 2 has a stator core 11. The stator core 11 includes an annular portion 12 and twelve teeth 13 (first to twelfth teeth 13a to 13l), which extend radially inward from the annular portion 12. The teeth 13 are arranged at equal angular intervals in the circumferential direction. Coils 14 (14a to 14l) are wound around the teeth 13.

The rotor 3 includes a rotary shaft 21, a rotor core 22, seven magnets 23, and seven salient poles 24. The rotor core 22 is annular and formed by applying a magnetic metal material to the outer circumferential surface of the rotary shaft 21. The magnets are arranged at equal angular intervals in the circumferential direction of the rotor core 22 in a peripheral part of the rotor core 22. The salient poles 24 are formed integrally with the peripheral part of the rotor core 22 in a manner that each salient pole is arranged between adjacent magnets 23. In other words, the magnets 23 and the salient poles 24 are arranged alternately at equal angular intervals. The rotor 3 is a consequent-pole rotor including the fourteen magnetic poles of the magnets 23, which function as north poles, and the salient poles 24, which function as south poles.

The wiring structure of the coils 14 in the stator 2 of the first embodiment and the current control executed over the coils 14 will now be described. For the sake of convenience, the teeth 13 are referred to as a first tooth 13a, a second tooth 13b, a third tooth 13c, . . . , an eleventh tooth 13k, and a twelfth tooth 13l in the order of their arrangement in the clockwise direction.

In the first embodiment, a conductive wire 30 is wound on the first tooth 13a to function as a V phase coil 14a. On the second tooth 13b, which is adjacent to the first tooth 13a in the circumferential direction, the wire 30 is wound in the direction reverse to the winding direction of the V phase coil 14a to function as a bar V phase coil 14b. The V phase coil 14a and the bar V phase coil 14b are connected in series by the conductive wire 30 to form a first coil group V1 of coils with the same phase that are adjacent to each other in the circumferential direction.

On the fifth tooth 13e, which is shifted by 120 degrees from the first tooth 13a clockwise in the circumferential direction, a conductive wire 31 is wound to function as a W phase coil 14e. On the sixth tooth 13f, which is adjacent to the fifth tooth 13e in the circumferential direction, the conductive wire 31 is wound in the direction reverse to the winding direction of the W phase coil 14e to function as a bar W phase coil 14f. The W phase coil 14e and the bar W phase coil 14f are connected in series by the conductive wire 31 to form a first coil group W1 of coils with the same phase that are adjacent to each other in the circumferential direction.

On the ninth tooth 13i, which is shifted by 120 degrees from the fifth tooth 13e clockwise in the circumferential direction, a conductive wire 32 is wound to function as a U phase coil 14i. On the tenth tooth 13j, which is adjacent to the ninth tooth 13i in the circumferential direction, the conductive wire 32 is wound in the direction reverse to the winding direction of the U phase coil 14i to function as a bar U phase coil 14j. The U phase coil 14i and the bar U phase coil 14j are connected in series by the conductive wire 32 to form a first coil group U1 of coils with the same phase that are adjacent to each other in the circumferential direction.

Figure 2A:
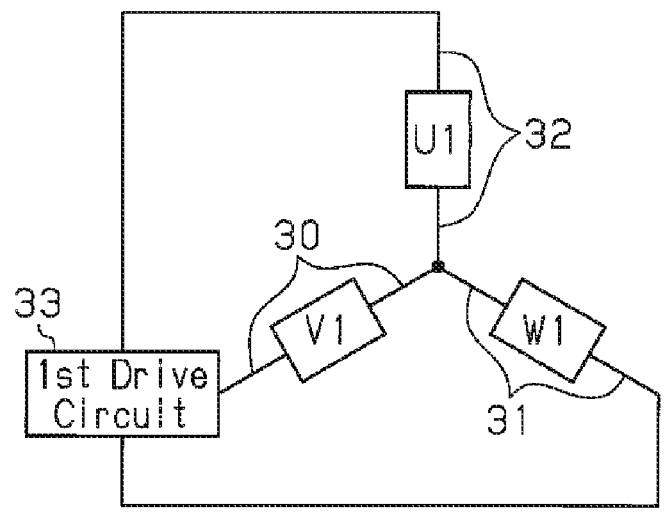
FIGS. 2A and 2B are diagrams illustrating the electric structure of the motor shown in FIG. 1.

As shown in FIG. 2A, the conductive wires 30 to 32 forming the three first coil groups U1, V1, and W1 each have an end connected to one another at one location. The first coil groups U1, V1, and W1 form a star-connection structure. The conductive wires 30 to 32 each have another end connected to a first drive circuit 33, which functions as a three-phase inverter circuit. Three-phase excitation currents having phases shifted from one another by 120 degrees are respectively supplied to the first coil groups U1, V1, and W1.

A second coil group V2 is separated by 180 degrees from the first coil group V1 in the circumferential direction and arranged at an opposite position (radially opposing position). More specifically, on the seventh teeth 13g, which is separated by 180 degrees from the first tooth 13a in the circumferential direction and arranged at an opposite position, a conductive wire 35 is wound in the direction reverse to the winding direction of the V phase coil 14a on the first tooth 13a to function as a bar V phase coil 14g. On the eighth tooth 13h, which is adjacent to the seventh tooth 13g in the circumferential direction, the conductive wire 35 is wound in the direction reverse to the winding direction of the bar V phase coil 14g to function as a V phase coil 14h. The bar V phase coil 14g and the V phase coil 14h are connected in series by the conductive wire 35 to form the second coil group V2 of coils with the same phase that are adjacent to each other in the circumferential direction.

A coil group W2 is separated by 180 degrees from the coil group W1 in the circumferential direction and arranged at an opposite position (radially opposing position). More specifically, on the eleventh tooth 13k, which is separated by 180 degrees from the fifth tooth 13e in the circumferential direction, a conductive wire 36 is wound in the direction reverse to the winding direction of the W phase coil 14e on the fifth tooth 13e to function as a bar W phase coil 14k. On the twelfth tooth 13l, which is adjacent to the eleventh tooth 13k in the circumferential direction, the conductive wire 36 is wound in the direction reverse to the winding direction of the bar W phase coil 14k to function as a W phase coil 14l. The bar W phase coil 14k and the W phase coil 14l are connected in series by the conductive wire 36 to form the second coil group W2 of coils with the same phase that are adjacent to each other in the circumferential direction.

A coil group U2 is arranged separated by 180 degrees from the coil group U1 in the circumferential direction and arranged at an opposite position (radially opposing position). More specifically, on the third tooth 13c, which is separated by 180 degrees from the ninth tooth 13i in the circumferential direction, a conductive wire 37 is wound in the direction reverse to the winding direction of the U phase coil 14i on the ninth tooth 13i to function as a bar U phase coil 14c. On the fourth tooth 13d, which is adjacent to the third tooth 13c in the circumferential direction, the conductive wire 37 is wound in the direction reverse to the winding direction of the bar U phase coil 14c to function as a U phase coil 14d. The bar U phase coil 14c and the U phase coil 14d are connected in series by the conductive wire 37 to form the second coil group U2 of coils with the same phase that are adjacent to each other in the circumferential direction.

Figure 2B:
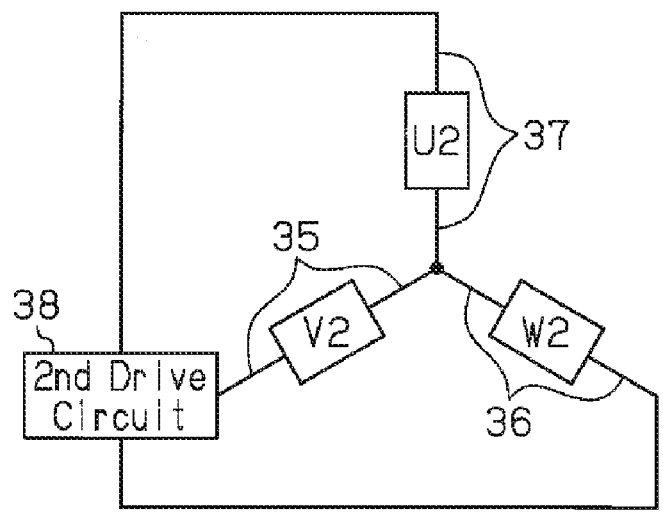

As shown in FIG. 2B, the conductive wires 35 to 37 forming the three second coil groups U2, V2, and W2 each have an end connected to one another at one location. The second coil groups U2, V2, and W2 form a star-connection structure. The conductive wires 35 to 37 each have another end connected to a second drive circuit 38, which functions as a three-phase inverter circuit. Three-phase excitation currents having phases shifted from one another by 120 degrees are respectively supplied to the second coil groups U2, V2, and W2.

Figure 3:
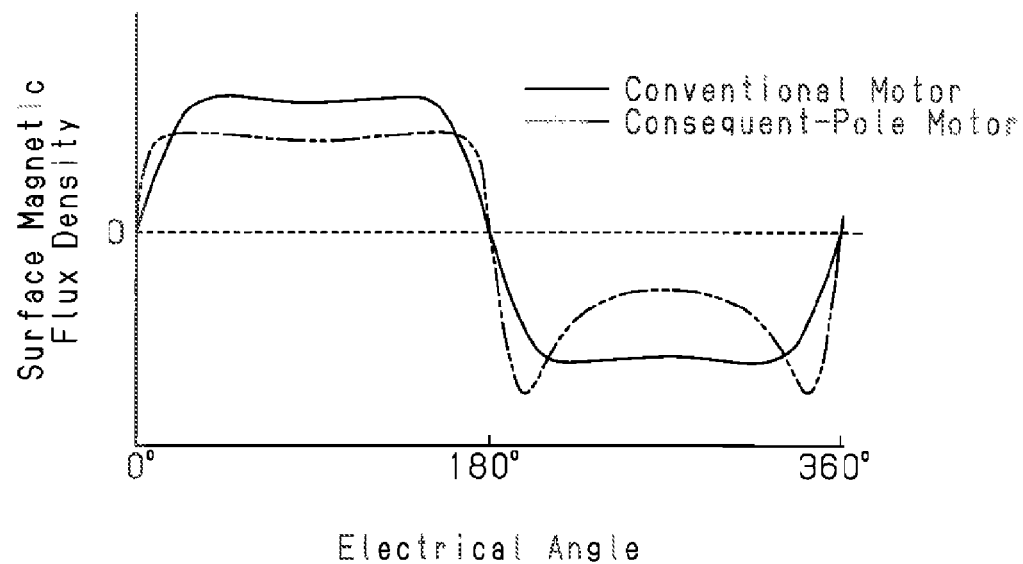
FIG. 3 is a diagram illustrating the surface magnetic flux density of a consequent-pole motor and of a conventional motor.
Figure 4A:
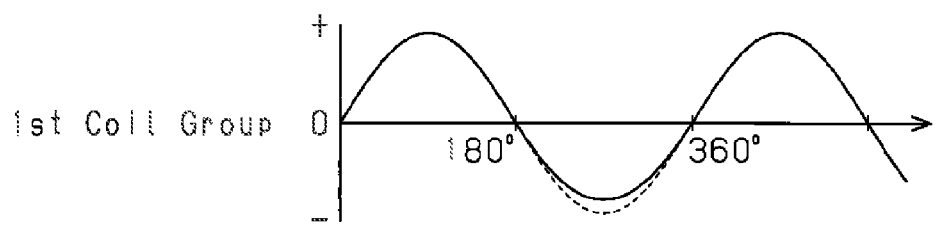
FIGS. 4A and 4B are diagrams illustrating current control executed over different coil groups.
Figure 4B:
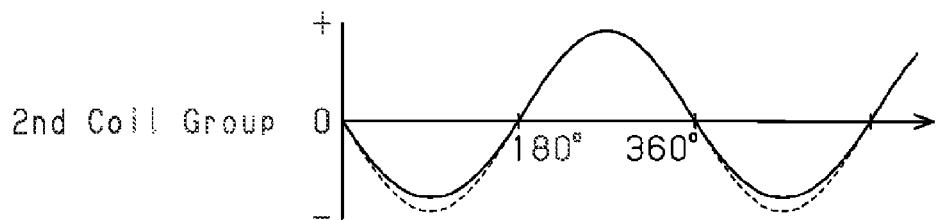

As shown in FIG. 4A, the excitation currents supplied from the first drive circuit 33 to the first coil groups U1, V1, and W1 are each adjusted in a manner that the absolute value of the negative element in the current value is smaller than the absolute value of the positive element in the current value. In the motor including the consequent-pole rotor, as shown in FIG. 3, the surface magnetic flux density of the rotor is asymmetrical in one electrical angle cycle. Thus, by differing the negative element and the positive element of the excitation current that is supplied to each of the first coil groups U1, V1, and W1, the magnetic flux acting on the teeth is adjusted to maintain balance in the radial direction. This reduces unbalanced force generated in the rotor 3. For the same reason, the excitation currents supplied from the second drive circuit 38 to the second coil groups U2, V2, and W2 are also adjusted so that the absolute value of the negative element in the excitation current is lower than the value of the positive element in the excitation current as shown in FIG. 4B. The difference between the positive element and the negative element of the excitation current depends on each individual motor and is set to an optimal value, which is calculated based on experiments or the like. The first drive circuit 33 and the second drive circuit 38 control the excitation currents in a manner that the first coil groups U1, V1, and W1 and the second coil groups U2, V2, and W2 have a phase difference of 180 degrees in an energized state. Thus, for example, when the excitation current supplied by the first drive circuit 33 is a positive component, the excitation current supplied by the second drive circuit 38 is a negative component. In this case, the current value of the excitation currents supplied from the first drive circuit 33 is greater than the current value of the excitation currents supplied from the second drive circuit 38. In the same manner, when the excitation current supplied by the first drive circuit 33 is a negative component, the excitation current supplied by the second drive circuit 38 is a positive component. In this case, the current value of the excitation currents supplied from the first drive circuit 33 is smaller than the current value of the excitation currents supplied from the second drive circuit 38. More specifically, the magnetic flux acting on the teeth facing toward the magnets differs from the magnetic flux acting on the teeth facing toward the salient poles. Thus, adjustment of the current values of the first coil groups U1, V1, and W1 to change in different manners from the current values of the second coil groups U2, V2, and W2 enables the magnetic flux acting on the teeth facing each coil group to maintain balance in the radial direction. This reduces unbalanced force generated in the rotor in the radial direction and reduces vibration in the motor 1.

The first embodiment has the advantages described below.

(1) The adjacent coils having the same phase, which are the V phase coils 14a and 14h and the bar V phase coils 14b and 14g, the U phase coils 14d and 14i and the bar U phase coils 14c and 14j, and the W phase coils 14e and 14l and the bar W phase coils 14f and 14k, are wound in different directions. The coils facing toward each other in the radial direction, which are the V phase coils 14a and 14h and the bar V phase coils 14g and 14b, the U phase coils 14d and 14i and the bar U phase coils 14j and 14c, and the W phase coils 14e and 14l and the bar W phase coils 14f and 14k, are wound in different directions. The plurality of coils 14a to 14l include the three-phase first coils groups U1, V1, and W1 and the three-phase second coil groups U2, V2, and W3. The phases of the first coil groups U1, V1, and W1 include the adjacent coils having the same phase and wound in different directions, which are the coils 14a and 14b, the coils 14e and 14f, and the coils 14i and 14j. The phases of the second coil groups U2, V2, and W2 include the adjacent coils having the same phase and wound in different directions, which are the coils 14c and 14d, the coils 14g and 14h, and the coils 14k and 14l. Further, the second coil groups U2, V2, and W2 respectively face toward the first coil groups U1, V1, and W1 of the same phase so that the coils facing toward each other in the radial direction, which are the coils 14a and 14g, the coils 14b and 14h, the coils 14e and 14k, the coils 14f and 14l, the coils 14i and 14c, and the coils 14j and 14d, have different winding directions. The first and second drive circuits 33 and 38, which function as current supply units, execute different current control over the first coil groups U1, V1, and W1 and over the second coil groups U2, V2, and W2. In the rotor 3 of the first embodiment having an odd number of pole pairs, the magnets 23 are separated by 180 degrees from the salient poles 24 in the circumferential direction. Thus, the energized coils 14a to 14l of each phase generates magnetic flux acting on the rotor 3 that is unbalanced in the radial direction. In this rotor, the first drive circuit 33 and the second drive circuit 38 are controlled to execute different current control over the first coil groups U1, V1, and W1 and the second coil groups U2, V2, and W2, which face toward the first coil groups U1, V1, and W1 in the radial direction, or which are separated by 180 degrees from the first coil groups U1, V1, and W1 and arranged at an opposite position in the circumferential direction. This reduces the above-mentioned unbalanced force generated in the radial direction, and reduces vibration in the motor.

(2) The first and second drive circuits 33 and 38 execute current control so that the current values of the first coil groups U1, V1, and W1 differ from the current values of the second coil groups U2, V2, and W2. In the motor 1 including the consequent-pole rotor 3, the surface magnetic flux density of the rotor 3 is asymmetrical in one electrical angle cycle (refer to FIG. 3). More specifically, the magnetic flux acting on the teeth facing the magnets 23 differs from the magnetic flux acting on the teeth facing the salient poles 24. Thus, adjustment of the current values of the first coil groups U1, V1, and W1 to change in different manners from the current values of the second coil groups U2, V2, and W2 balances the magnetic flux acting on the teeth 13 in the radial direction. This reduces unbalanced force generated in the rotor in the radial direction.

A second embodiment of the present invention will now be described. The components in the second embodiment that are the same as the components in the first embodiment are given the same reference numerals as those components, and will not be described or will be described only partially.

Figure 5:
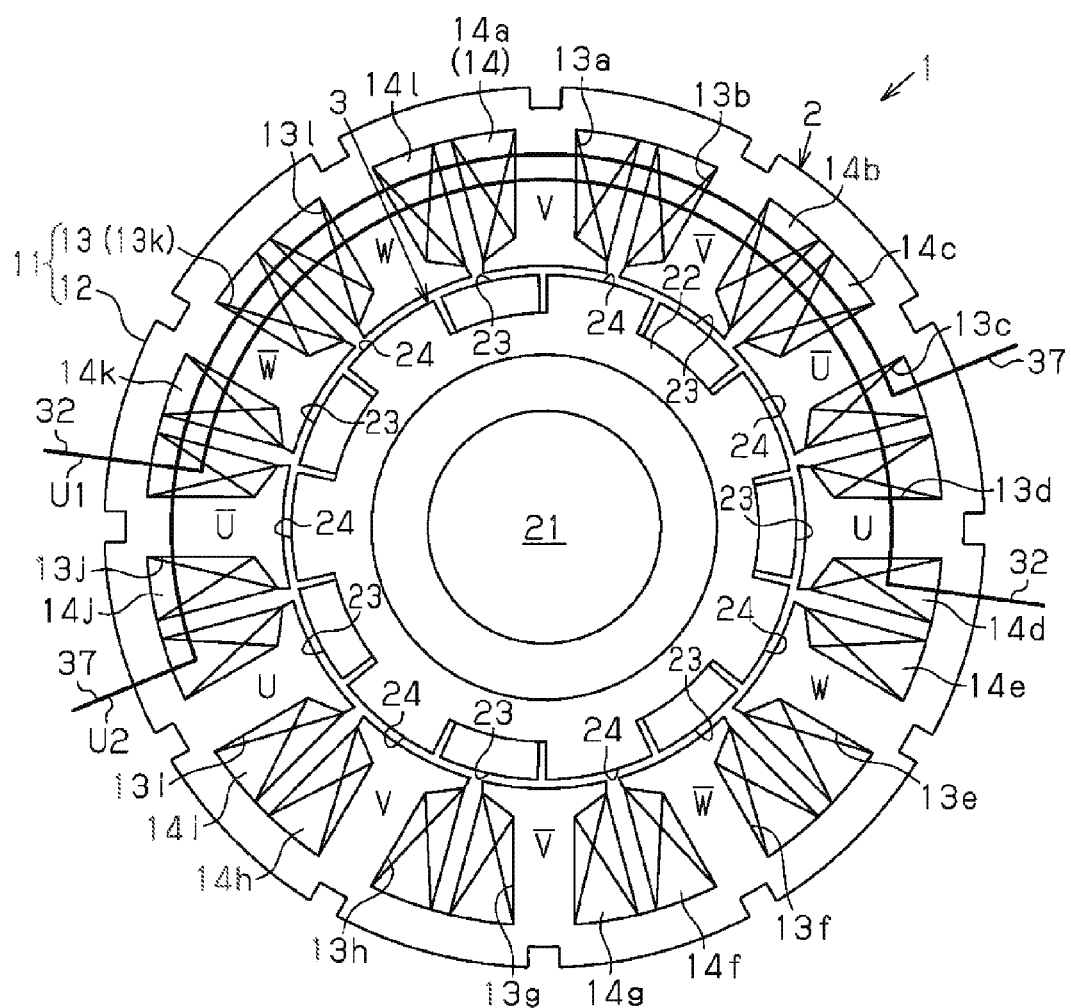
FIG. 5 is a plan view of a motor according to a second embodiment of the present invention.

As shown in FIG. 5, a conductive wire 32 is wound around a fourth tooth 13d to function as a U phase coil 14d. On a tenth tooth 13j, which is separated by 180 degrees from the fourth tooth 13d in the circumferential direction, the conductive wire 32 is wound in the direction reverse to the winding direction of the U phase coil 14d to function as a bar U phase coil 14j. The U phase coil 14d and the bar U phase coil 14j form a first coil group U1.

On an eighth tooth 13h, which is shifted by 120 degrees from the fourth tooth 13d in the circumferential direction, a conductive wire (not shown) is wound to function as a V phase coil 14h. The conductive wire is extended to a second tooth 13b, which is located on the opposite side and separated by 180 degrees from the eighth tooth 13h clockwise in the circumferential direction, and is wound around the second tooth 13b in the direction reverse to the winding direction of the V phase coil 14h to function as a bar V phase coil 14b. The V phase coil 14h and the bar V phase coil 14b form a first coil group V1.

On a twelfth tooth 13l, which is shifted by 120 degrees from the eighth tooth 13h clockwise in the circumferential direction, a conductive wire (not shown) is wound to function as a W phase coil 14l. The conductive wire is extended to a sixth tooth 13f, which is located on the opposite side and separated by 180 degrees from the twelfth tooth 13l in the circumferential direction, and is wound around the sixth tooth 13*f* in the direction reverse to the winding direction of the W phase coil 14*l* to function as a bar W phase coil 14*f*. The W phase coil 14*l* and the bar W phase coil 14*f* form a first coil group W1.

As shown in FIG. 2A, the conductive wires 30 to 32 forming the three first coil groups U1, V1, and W1 each have an end connected to one another at one location. The first coil groups U1, V1, and W1 form a star-connection structure. The conductive wires 30 to 32 each have another end connected to a first drive circuit 33. Three-phase excitation currents having phases are respectively supplied to the first coil groups U1, V1, and W1.

On a third tooth 13*c*, which is adjacent to the fourth tooth 13*d* counterclockwise in the circumferential direction, a conductive wire 37 is wound in the direction reverse to the winding direction of the U phase coil 14*d* on the fourth tooth 13*d* to function as a bar U phase coil 14*c*. On a ninth tooth 13*i*, which is located on the opposite side and separated by 180 degrees from the third tooth 13*c* in the circumferential direction, the conductive wire 37 is wound in the direction reverse to the winding direction of the bar U phase coil 14*c* to function as a U phase coil 14*i*. The bar U phase coil 14*c* and the U phase coil 14*i* form a second coil group U2.

On a seventh tooth 13*g*, which is adjacent to the eighth tooth 13*h* counterclockwise in the circumferential direction, a conductive wire (not shown) is wound in the direction reverse to the winding direction of the V phase coil 14*h* on the eighth tooth 13*h* to function as a bar V phase coil 14*g*. The conductive wire is extended to a first tooth 13*a*, which is located on the opposite side and separated by 180 degrees from the seventh tooth 13*g* in the circumferential direction, and is wound around the first tooth 13*a* in the direction reverse to the winding direction of the bar V phase coil 14*g* to function as a V phase coil 14*a*. The bar V phase coil 14*g* and the V phase coil 14*a* form a second coil group V2.

On an eleventh tooth 13*k*, which is adjacent to the twelfth tooth 13*l* counterclockwise in the circumferential direction, a conductive wire (not shown) is wound in the direction reverse to the winding direction of the W phase coil 14*l* on the twelfth tooth 13*l* to function as a bar W phase coil 14*k*. The conductive wire is extended to a fifth tooth 13*e*, which is located on the opposite side and separated by 180 degrees from the eleventh tooth 13*k* in the circumferential direction, and is wound around the fifth tooth 13*e* in the direction reverse to the winding direction of the bar W phase coil 14*k* to function as a W phase coil 14*e*. The bar W phase coil 14*k* and the W phase coil 14*e* form a second coil group W2.

As shown in FIG. 2B, the conductive wires 35 to 37 forming the three second coil groups U2, V2, and W2 each have an end connected to one another at one location. The second coil groups U2, V2, and W2 form a star-connection structure. The conductive wires 35 to 37 each have another end connected to a second drive circuit 38, which functions as a three-phase inverter circuit. Three-phase excitation currents having phases shifted from one another by 120 degrees are respectively supplied to the second coil groups U2, V2, and W2.

The first drive circuit 33 and the second drive circuit 38 are controlled in a manner that the first coil groups U1, V1, and W1 and the second coil groups U2, V2, and W2 will have a phase difference θ of 30 degrees in an energized state. The relationship between the energized-state phase difference θ and the value of the unbalanced force generated in the rotor will now be described with reference to FIG. 6. The rotor unbalanced force ratio is set to 1 when the energized-state phase difference θ is 0 degrees. In this case, the rotor unbalanced force decreases as the energized-state phase difference θ increases from 0 degree and approaches 30 degrees. After the energized-state phase difference θ reaches 30 degrees, the rotor unbalanced force increases as the energized-state phase difference θ increases. When the energized-state phase difference θ is 30 degrees, the rotor unbalanced force is just slightly greater than 0.1. In other words, setting the energized-state phase difference θ to 30 degrees will maximize the effect of reducing the rotor unbalanced force.

Figure 6:
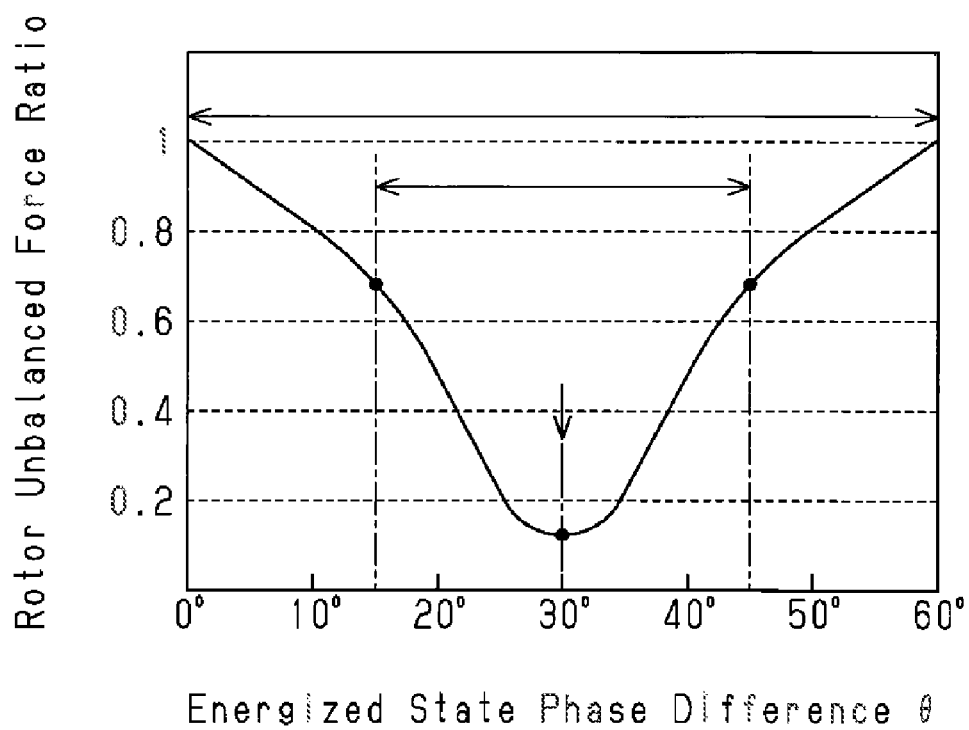
FIG. 6 is a diagram illustrating the relationship between an energized-state phase difference and a rotor unbalanced force ratio.

In this manner, by supplying excitation currents so that the excitation current from the first drive circuit 33 and the excitation current from the second drive circuit 38 have an energized-state phase difference of 30 degrees, the unbalanced force generated in the rotor is decreased to a sufficiently low level, as shown in FIG. 6. This reduces vibration in the motor.

The second embodiment has the advantages described below.

(1) The adjacent coils having the same phase, which are the V phase coils 14*a* and 14*h* and the bar V phase coils 14*b* and 14*g*, the U phase coils 14*d* and 14*i* and the bar U phase coils 14*c* and 14*j*, and the W phase coils 14*e* and 14*l* and the bar W phase coils 14*f* and 14*k*, are wound in different directions. The coils facing toward each other in the radial direction, which are the V phase coils 14*a* and 14*h* and the bar V phase coils 14*g* and 14*b*, the U phase coils 14*d* and 14*i* and the bar U phase coils 14*j* and 14*c*, and the W phase coils 14*e* and 14*l* and the bar W phase coils 14*f* and 14*k*, are wound in different directions. The plurality of coils 14*a* to 14*l* include the three-phase first coils groups U1, V1, W1 and the three-phase second coil groups U2, V2, and W2. The first coil groups U1, V1, and W1 of each phase includes the coils of the same phase having different winding directions and facing toward each other in the radial direction, which are the coils 14*b* and 14*h*, the coils 14*d* and 14*j*, and the coils 14*f* and 14*l*. The second coil groups U2, V2, and W2 of each phase includes the coils of the same phase having different winding directions and facing each other in the radial direction, which are the coils 14*a* and 14*g*, the coils 14*c* and 14*i*, and the coils 14*e* and 14*k*. Further, each of the second coil groups U2, V2, and W2 is adjacent to one of the first coil groups U1, V1, and W1 having the same phase as the second coil group so that the adjacent coils having the same phase, which are the coils 14*a* and 14*b*, the coils 14*c* and 14*d*, the coils 14*e* and 14*f*, the coils 14*g* and 14*h*, the coils 14*i* and 14*j*, and the coils 14*k* and 14*l*, have different winding directions. The first and second drive circuits 33 and 38, which function as current supply units, execute different current control over the coil groups U1, V1, and W1 and over the second coil groups U2, V2, and W2. More specifically, the number of coils C included in the stator 2 is 12, and the number of poles P included in the rotor 3 is 14. The first and second drive circuits 33 and 38, which function as current supply units, are set so that the energized-state phase difference θ between the first coil groups U1, V1, and W1 and the second coil groups U2, V2, and W2 is 30 degrees. This further decreases the unbalanced force generated in the rotor (refer to FIG. 6) and further reduces vibration in the motor.

The embodiments of the present invention may be modified in the following forms.

Although the number of poles is 14 (the number of pole pairs is 7) and the number of coils is 12 in the first and second embodiments, the present invention is not limited in such a manner. For example, a structure may be employed in which the ratio P/C of the number of poles P and the number of coils C is (4n−2)/3m (where n and m are positive numbers that are equal to or greater than 2). More specifically, a structure may be employed in which the ratio P/C is (12k±2)/12k (where k is a positive integer). In particular, in a structure including 10 poles (5 pole pairs) and 12 coils, the rotor unbalanced force is most decreased when the energized-state phase difference θ is set to 30 degrees in the same manner as in the motor including 14 poles (7 pole pairs) and 12 coils.

In the second embodiment, the energized state phase difference θ between the first coil groups U1, V1, and W1 and the second coil groups U2, V2, and W2 is set to 30 degrees. In the second embodiment, the energized state phase difference θ is required to be at least in the range of 0°<θ≦60° to reduce the unbalanced force or may be set in a narrower range of 15°<θ≦45° to reduce the unbalanced force.

In the first and second embodiments, the present invention is applied to the motor 1 of an inner rotor type. Alternatively, the present invention may be applied to an outer rotor type motor.

In the first and second embodiments, the three-phase first coil groups U1 to W1 are connected to form a star connection, and the three-phase second coil groups U2 to W2 are connected to form a star connection. Alternatively, the first coil groups may be connected to form a delta connection, and the second coil groups may be connected to form a delta connection.

A third embodiment of the present invention will now be described with reference to the drawings.

Figure 7:
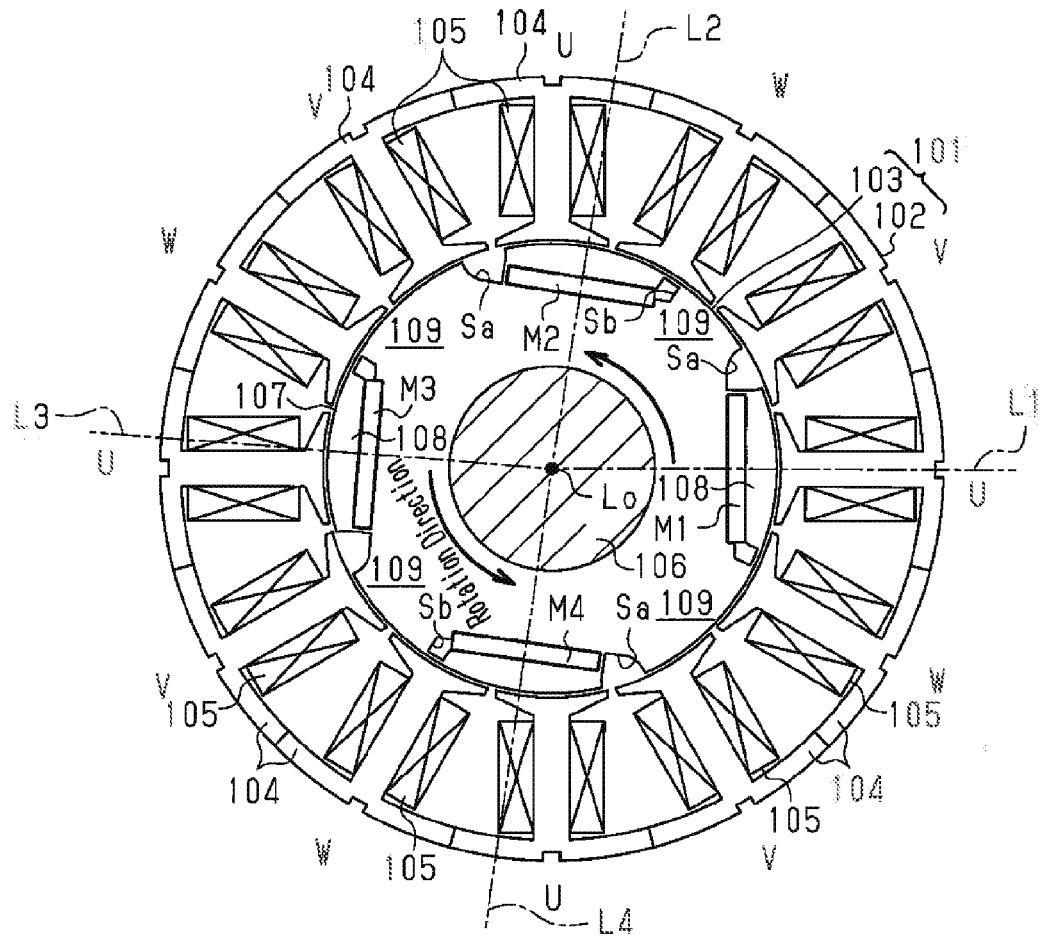
FIG. 7 is a view schematically showing the structure of a motor according to a third embodiment of the present invention.
Figure 8:
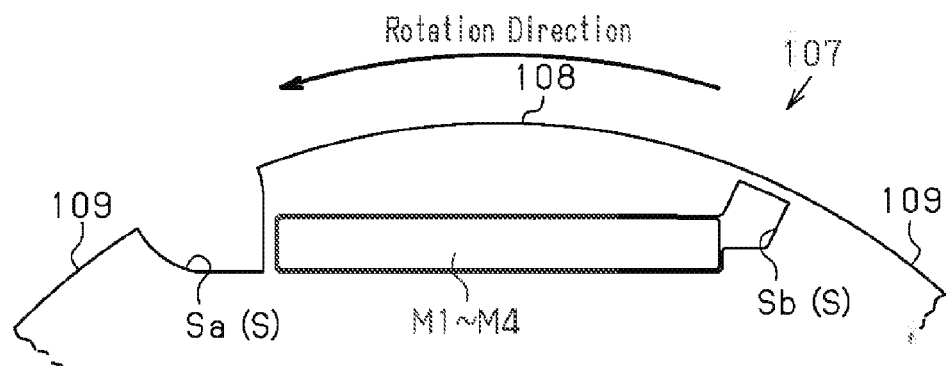
FIG. 8 is an enlarged view showing essential parts of the rotor shown in FIG. 7.
Figure 9:
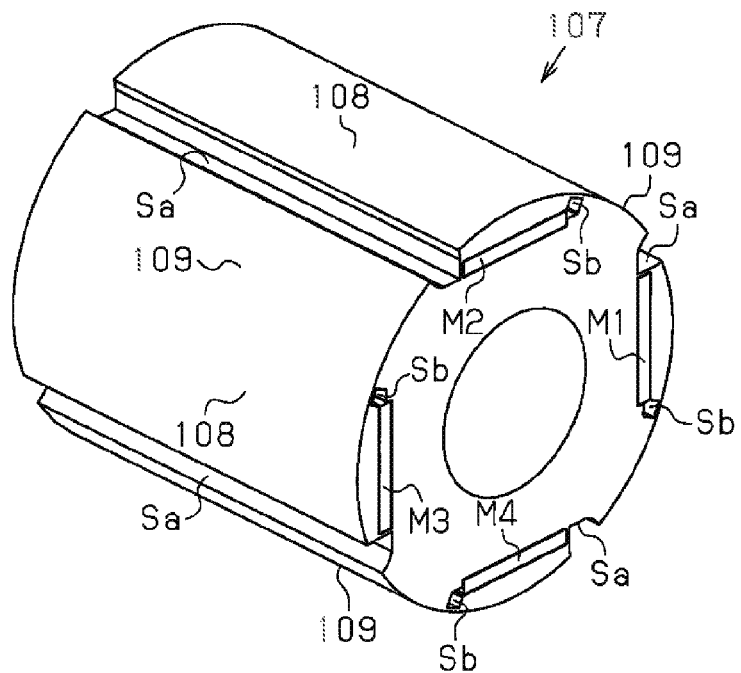
FIG. 9 is a perspective view of the entire rotor core shown in FIG. 7 in which first to fourth permanent magnets are embedded.

FIG. 7 schematically shows the structure of a brushless motor (IPM motor) in the third embodiment. FIG. 8 is an enlarged view showing essential parts of a rotor included in the motor. FIG. 9 is a perspective view showing the entire rotor core in which permanent magnets are embedded.

As shown in FIG. 7, a brushless motor 101, which serves as a rotary motor, includes an annular stator 102, which is arranged along the inner circumferential surface of a motor housing (not shown), and a rotor 103, which is arranged at the inner side of the stator 102 in a rotatable manner.

The stator 102 includes twelve teeth 104. The twelve teeth 104 are arranged annularly to form 12 slots between the teeth 104. A coil 105 is wound around each tooth 104 as a concentrated winding. Three-phase alternating currents are supplied to the wound coils 105, and the U phase, V phase, and W phase are sequentially arranged in the direction of rotation.

The rotor 103 includes a rotary shaft 106 and a cylindrical rotor core 107, which is fixed to the rotary shaft 106. The rotary shaft 106 is arranged so that its axis Lo is aligned with the axis of the stator 102. The two ends of the rotary shaft 106 are supported in a rotatable manner by bearings (not shown) arranged in the motor housing. Accordingly, the rotor 103 (rotor core 107) is supported at the inner side of the stator 102 to be rotatable about the axis Lo, which serves as the rotation center.

In the brushless motor 101 of the third embodiment, the rotor 3 is driven to rotate counterclockwise as viewed in FIG. 7.

The rotor core 107 is cylindrical as shown in FIG. 9. A plurality of (four in the third embodiment) planar permanent magnets, namely, first to fourth permanent magnets M1 to M4, are arranged in the rotor core 107. The first to fourth permanent magnets M1 to M4 are sequentially arranged at predetermined angular intervals in the circumferential direction in the rotation direction of the rotor core 107. The first to fourth permanent magnets M1 to M4 are embedded at positions near the outer circumferential surface of the rotor core 107. In other words, the rotor 103 of the third embodiment has the so-called IPM structure that embeds the first to fourth permanent magnets M1 to M4.

Regions in the outer circumferential surface of the rotor core 107 facing the magnetic pole face of the embedded first to fourth permanent magnets M1 to M4 function as first magnetic pole portions 108. In the third embodiment, the embedded four permanent magnets, namely, the first to fourth permanent magnets M1 to M4, form the four first magnetic pole portions 108 on the outer circumferential surface of the rotor core 107.

The embedded first to fourth permanent magnets M1 to M4 are arranged so that the magnetic pole faces at the radially outward side are of the same pole (south pole in the present embodiment). As a result, the rotor 103 of the third embodiment includes the four first magnetic pole portions 108 having the same polarity (south poles) arranged at unequal angular intervals in the circumferential direction.

Further, the rotor core 107 has clearances S (Sa, Sb) formed at the two circumferential ends of each of the first to fourth permanent magnets M1 to M4. The clearances S function as magnetic resistors. As a result, the rotor core 107 includes second magnetic pole portions 109 that are formed between the adjacent first magnetic pole portions 108 (the permanent magnets M1 to M4). The second magnetic pole portions 109 are magnetically separated from the first magnetic pole portions 108 in the circumferential direction.

The magnetic flux of each first magnetic pole portion 108 passes through the inside of the rotor core 107 so as to bypass the clearances S formed at the two ends of each first magnetic pole portion 108 in the circumferential direction and enters each second magnetic pole portion 109. The magnetic flux then passes through each second magnetic pole portion 109 in a radially outward direction. This forms in each second magnetic pole portion 109 a dummy magnetic pole (north pole) having a different polarity from the adjacent first magnetic pole portion 108.

In this manner, the rotor 103 of the third embodiment is formed as a so-called consequent-pole rotor.

In the third embodiment, the clearances S (Sa, Sb) formed at the two ends of each first magnetic pole portion 108 are formed to be asymmetrical as shown in FIG. 8. This increases the torque and improves the torque characteristics.

The brushless motor 101 in the third embodiment rotates in only one direction (counterclockwise as viewed in FIGS. 7 and 8). The clearances S (Sa, Sb) formed at the two ends of each first magnetic pole portion 108 have different shapes to optimize the structure of the motor in the direction of rotation. More specifically, the clearance Sa, which is in front of the clearance Sb in the rotation direction of the rotor 103, is wider in the circumferential direction than the clearance Sb, which is behind the clearance Sa in the rotation direction of the rotor 103.

The first to fourth permanent magnets M1 to M4, which are planar magnets, have the same shape. The first to fourth permanent magnets M1 to M4 are arranged in a manner so that their longer sides extend in the direction of the axis Lo. The length of the longer side is equal to the length of the rotor core 107 in the axial direction. The first to fourth permanent magnets M1 to M4 are embedded at equal distances from the axis Lo in a manner that their longer sides are parallel to the axis Lo and their shorter sides are orthogonal to lines connecting the center of their shorter sides and the axis Lo (first to fourth center lines L1 to L4). More specifically, the first to fourth permanent magnets M1 to M4 are embedded in a manner that their magnetic pole faces are vertical as viewed from the rotation center of the rotor 103.

The first to fourth permanent magnets M1 to M4 embedded in the rotor core 107 are arranged at unequal angular intervals as viewed from the axis Lo.

Figure 10:
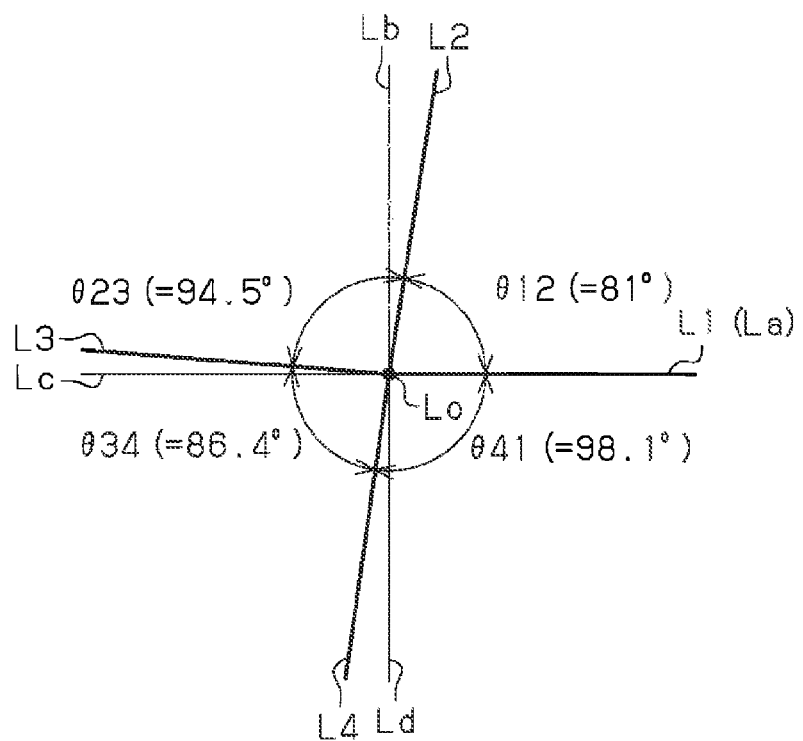
FIG. 10 is a diagram illustrating the first to fourth permanent magnets that are arranged at unequal angular intervals.

In the third embodiment, a first angle θ12 formed by the first center line L1 of the first permanent magnet M1 and the second center line L2 of the second permanent magnet M2, which is adjacent to the first permanent magnet M1 in the rotation direction, is 81 degrees as shown in FIG. 10.

A second angle θ23 formed by the second center line L2 of the second permanent magnet M2 and the third center line L3 of the third permanent magnet M3, which is adjacent to the second permanent magnet M2 in the rotation direction, is 94.5 degrees.

A third angle θ34 formed by the third center line L3 of the third permanent magnet M3 and the fourth center line L4 of the fourth permanent magnet M4, which is adjacent to the third permanent magnet M3 in the rotation direction, is 86.4 degrees.

A fourth angle θ41 formed by the fourth center line L4 of the fourth permanent magnet M4 and the first center line L1 of the first permanent magnet M1, which is adjacent to the fourth permanent magnet M4 in the rotation direction, is 98.1 degrees.

The operation of the brushless motor 101 will now be described by comparing the brushless motor 101 with a conventional brushless motor.

Figure 11:
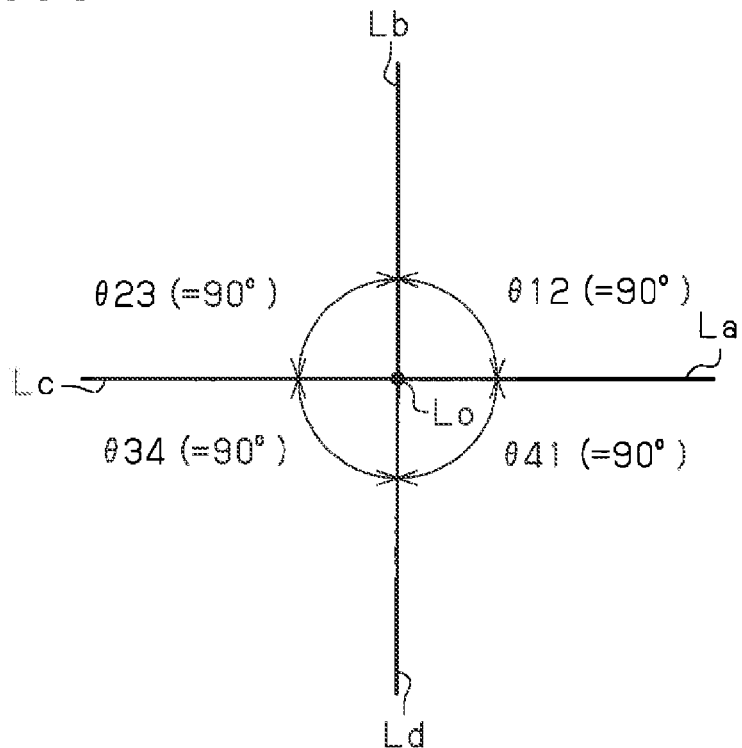
FIG. 11 is a diagram illustrating the arrangement interval of conventional first to fourth permanent magnets.

The conventional brushless motor will first be described. The conventional brushless motor differs from the brushless motor 101 of the third embodiment only in that first to fourth permanent magnets M1 to M4 are embedded in a rotor core 107 at equal angular intervals as viewed from the axis Lo. Otherwise, the structure of the conventional brushless motor is the same as the structure of the brushless motor 101 of the third embodiment. As shown in FIG. 11, the brushless motor is formed in a manner that a first angle θ12, a second angle θ23, a third angle θ34, and a fourth angle θ41 are all 90 degrees.

In FIG. 11, a first base line La corresponds to the first center line L1 of the first permanent magnet M1 in the third embodiment, a second base line Lb corresponds to the second center line L2 of the second permanent magnet M2 in the third embodiment, a third base line Lc corresponds to the third center line L3 of the third permanent magnet M3 in the third embodiment, and a fourth base line Ld corresponds to the fourth center line L4 of the fourth permanent magnet M4 in the third embodiment.

An experiment was conducted by driving the brushless motor 101 of the third embodiment and the conventional brushless motor to produce rotation in the counterclockwise direction. Then, the torque, torque ripple, and cogging torque of the brushless motor 101 and the conventional brushless motor were compared.

Table 1 below shows the results.

TABLE 1

| | Angle (Degrees) | | | | Torque | Torque Ripple | Cogging Torque |
|---|---|---|---|---|---|---|---|
| | θ12 | θ23 | θ34 | θ41 | [%] | [%] | [%] |
| Equal Angular Arrangement | 90 | 90 | 90 | 90 | 100 | 100 | 100 |
| Unequal Angular Arrangement | 81 | 94.5 | 86.4 | 98.1 | 96 | 49 | 22 |

As evident from Table 1, when the maximum torque of the conventional brushless motor (equal angular arrangement) is set to 100%, the maximum torque of the brushless motor 101 of the third embodiment is 96%, which is slightly lower.

When the minimum torque ripple of the conventional brushless motor (equal angular arrangement) is set to 100%, the minimum torque ripple of the brushless motor 101 of the third embodiment is 49%, which is extremely low. It is considered that the arrangement of the first to fourth permanent magnets M1 to M4, which are embedded at unequal angular intervals, greatly lower torque ripple from that of the conventional brushless motor.

When the minimum cogging torque of the conventional brushless motor (unequal angular arrangement) is set to 100%, the minimum cogging torque of the brushless motor 101 of the third embodiment is 22%, which is extremely low. It is considered that the arrangement of the first to fourth permanent magnets M1 to M4, which are embedded at unequal angular intervals, greatly lowers the cogging torque of the brushless motor in the third embodiment from that of the conventional brushless motor.

The arrangement of the first to fourth permanent magnets M1 to M4 at unequal angular intervals causes changes in the magnetic flux density that are canceled out at each second magnetic pole portion 109. It is considered that this reduces the torque ripple and the cogging torque of the brushless motor.

It is considered that the decrease in the torque is small because the average magnetic flux subtly changes even when the first to fourth permanent magnets M1 to M4 are arranged at unequal angular intervals.

The third embodiment has the advantages described below.

(1) In the third embodiment, the first to fourth permanent magnets M1 to M4, which are embedded in the rotor core 107 of the brushless motor 101 sequentially in the rotation direction, are arranged at unequal angular intervals as viewed from the axis Lo.

In detail, the first to fourth permanent magnets M1 to M4 are arranged in the rotor core 107 of the brushless motor 101 so that the first angle θ12 formed by the first permanent magnet M1 and the second permanent magnet M2 is 81 degrees, the second angle θ23 formed by the second permanent magnet M2 and the third permanent magnet M3 is 94.5 degrees, the third angle θ34 formed by the third permanent magnet M3 and the fourth permanent magnet M4 is 86.4 degrees, and the fourth angle θ41 formed by the fourth permanent magnet M4 and the first permanent magnet M1 is 98.1 degrees.

This reduces the torque ripple and the cogging torque while maintaining the torque characteristics of the conventional brushless motor (equal angular arrangement) including the asymmetrical clearances S1 and Sb.

A fourth embodiment of the present invention will now be described.

In the same manner as the third embodiment, a rotor of the fourth embodiment is a consequent-pole rotor having an IPM structure in which permanent magnets are embedded in its rotor core. In the fourth embodiment, the number of stator teeth and the number of permanent magnets are the same as the third embodiment. In the fourth embodiment, the first to fourth permanent magnets M1 to M4 are arranged at unequal angular intervals so that the first to fourth angles θ12, θ23, θ34, and θ41 differ from the third embodiment.

Accordingly, items differing from the third embodiment will be described in detail, while items that are the same as the third embodiment will not be described for the sake of convenience.

A brushless motor 101 of the fourth embodiment differs from the third embodiment in the first to fourth angles θ12, θ23, θ34, and θ41.

Figure 12:
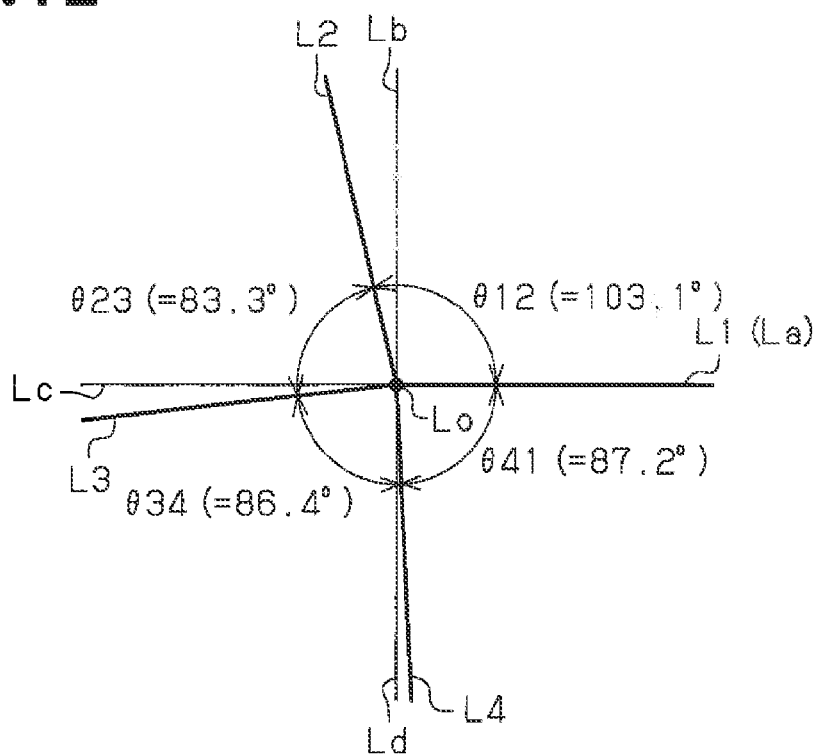
FIG. 12 is a diagram illustrating first to fourth permanent magnets that are arranged at unequal angular intervals in a motor according to a fourth embodiment of the present invention.

As shown in FIG. 12, the first angle θ12 formed by a first center line L1 of the first permanent magnet M1 and a second center line L2 of the second permanent magnet M2, which is adjacent to the first permanent magnet M1 in the rotation direction, is 103.1 degrees.

The second angle θ23 formed by a second center line L2 of the second permanent magnet M2 and a third center line L3 of the third permanent magnet M3, which is adjacent to the second permanent magnet M2 in the rotation direction, is 83.3 degrees.

The third angle θ34 formed by a third center line L3 of the third permanent magnet M3 and a fourth center line L4 of the fourth permanent magnet M4, which is adjacent to the third permanent magnet M3 in the rotation direction, is 86.4 degrees.

The fourth angle θ41 formed by a fourth center line L4 of the fourth permanent magnet M4 and the first center line L1 of the first permanent magnet M1, which is adjacent to the fourth permanent magnet M4 in the rotation direction, is 87.2 degrees.

An experiment was conducted by driving the brushless motor 101 of the fourth embodiment and the conventional brushless motor (equal angular arrangement) to produce rotation in the counterclockwise direction. Then, the torque, torque ripple, and cogging torque of the brushless motor 101 and the conventional brushless motor were compared.

Table 2 below shows the results.

TABLE 2

|  | Angle (Degrees) | | | | Torque [%] | Torque Ripple [%] | Cogging Torque [%] |
| --- | --- | --- | --- | --- | --- | --- | --- |
|  | θ12 | θ23 | θ34 | θ41 |  |  |  |
| Equal Angular Arrangement | 90 | 90 | 90 | 90 | 100 | 100 | 100 |
| Unequal Angular Arrangement | 103.1 | 83.3 | 86.4 | 87.2 | 95 | 60 | 19 |

As evident from Table 2, when the maximum torque of the conventional brushless motor (equal angular arrangement) is set to 100%, the maximum torque of the brushless motor 101 of the fourth embodiment is 95%, which is slightly lower.

When the minimum torque ripple of the conventional brushless motor is set to 100%, the minimum torque ripple of the brushless motor 101 of the fourth embodiment is 60%, which is extremely low. It is considered that the arrangement of the first to fourth permanent magnets M1 to M4, which are embedded at unequal angular intervals, greatly lowers the torque ripple from that of the conventional brushless motor.

When the minimum cogging torque of the conventional brushless motor is set to 100%, the minimum cogging torque of the brushless motor 101 of the fourth embodiment is 19%, which is extremely low. It is considered that the arrangement of the first to fourth permanent magnets M1 to M4, which are embedded at unequal angular intervals, greatly lowers the cogging torque of the brushless motor in the fourth embodiment from that of the brushless motor in the third embodiment.

The arrangement of the first to fourth permanent magnets M1 to M4 at unequal angular intervals causes changes in the magnetic flux density that are canceled out at each second magnetic pole portion 109. It is considered that this reduces the torque ripple and the cogging torque of the brushless motor.

It is considered that the decrease in the torque is small because the average magnetic flux subtly changes even when the first to fourth permanent magnets M1 to M4 are arranged at unequal angular intervals.

The fourth embodiment has the advantages described below.

(1) In the fourth embodiment, the first to fourth permanent magnets M1 to M4, which are embedded in the rotor core 107 of the brushless motor 101 sequentially in the rotation direction, are arranged at unequal angular intervals as viewed from the axis Lo.

In detail, the first to fourth permanent magnets M1 to M4 are arranged in the rotor core 107 of the brushless motor 101 so that the first angle θ12 formed by the first permanent magnet M1 and the second permanent magnet M2 is 103.1 degrees, the second angle θ23 formed by the second permanent magnet M2 and the third permanent magnet M3 is 83.3 degrees, the third angle θ34 formed by the third permanent magnet M3 and the fourth permanent magnet M4 is 86.4 degrees, and the fourth angle θ41 formed by the fourth permanent magnet M4 and the first permanent magnet M1 is 87.2 degrees.

This reduces the torque ripple and the cogging torque while maintaining the torque characteristics of the conventional brushless motor (equal angular arrangement) including the asymmetrical clearances S1 and Sb. In particular, the motor with this structure reduces the cogging torque more from the brushless motor of the third embodiment.

A fifth embodiment of the present invention will now be described.

In the same manner as the third and fourth embodiments, a rotor of the fifth embodiment is a consequent-pole rotor having an IPM structure in which permanent magnets are embedded in its rotor core. In the fifth embodiment, the number of stator teeth and the number of permanent magnets are the same as those in the third and fourth embodiments. In the fifth embodiment, first to fourth permanent magnets M1 to M4 are arranged at unequal angular intervals so that the first to fourth angles θ12, θ23, θ34, and θ41 differ from the third and fourth embodiments.

Accordingly, items differing from the third and fourth embodiments will be described in detail, while items that are the same as the third and fourth embodiments will not be described for the sake of convenience.

A brushless motor 101 of the fourth embodiment differs from the motors of the third and fifth embodiments in the first to fourth angles θ12, θ23, θ34, and θ41.

Figure 13:
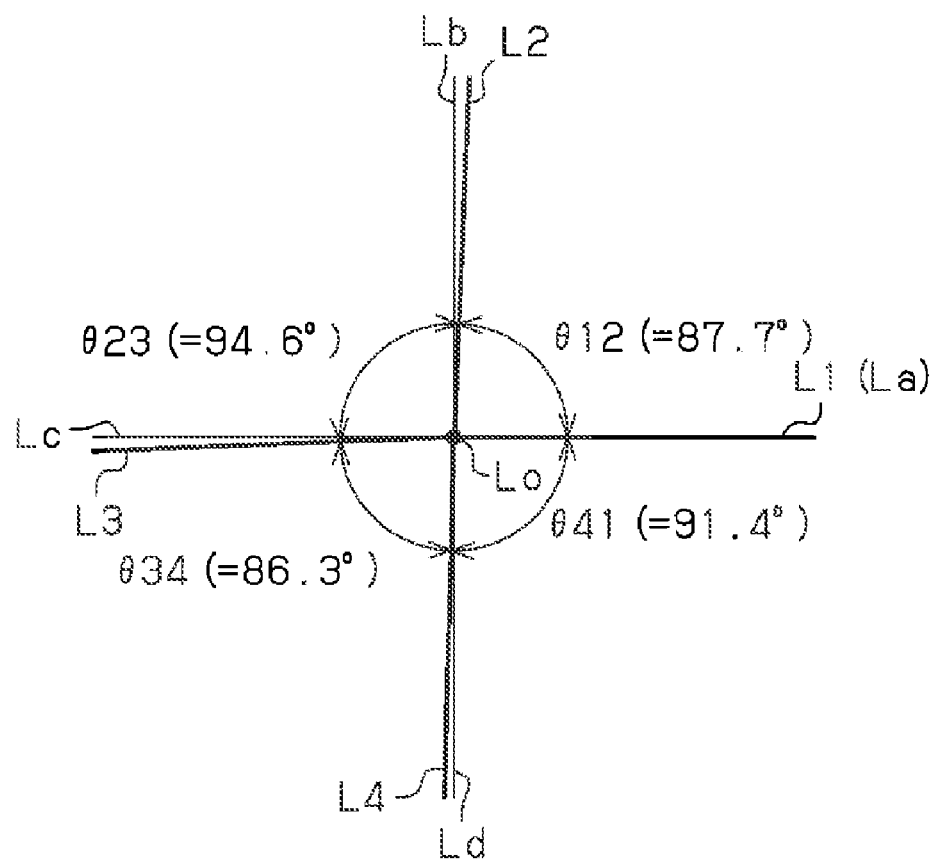
FIG. 13 is a diagram illustrating first to fourth permanent magnets that are arranged at unequal angular intervals in a motor according to a fifth embodiment of the present invention.

As shown in FIG. 13, the first angle θ12 formed by a first center line L1 of the first permanent magnet M1 and a second center line L2 of the second permanent magnet M2, which is adjacent to the first permanent magnet M1 in the rotation direction, is 87.7 degrees.

The second angle θ23 formed by a second center line L2 of the second permanent magnet M2 and a third center line L3 of the third permanent magnet M3, which is adjacent to the second permanent magnet M2 in the rotation direction, is 94.6 degrees.

The third angle θ34 formed by a third center line L3 of the third permanent magnet M3 and a fourth center line L4 of the fourth permanent magnet M4 adjacent to the third permanent magnet M3 in the rotation direction is 86.3 degrees.

The fourth angle θ41 formed by a fourth center line L4 of the fourth permanent magnet M4 and the first center line L1 of the first permanent magnet M1 adjacent to the fourth permanent magnet M4 in the rotation direction is 91.4 degrees.

An experiment was conducted by driving the brushless motor 101 of the fifth embodiment and the conventional brushless motor (equal angular arrangement) to produce rotation in the counterclockwise direction. Then, the torque, torque ripple, and cogging torque of the brushless motor 101 and the conventional brushless motor were compared.

Table 3 below shows the results.

TABLE 3

|  | Angle (Degrees) | | | | Torque [%] | Torque Ripple [%] | Cogging Torque [%] |
| --- | --- | --- | --- | --- | --- | --- | --- |
|  | θ12 | θ23 | θ34 | θ41 |  |  |  |
| Equal Angular Arrangement | 90 | 90 | 90 | 90 | 100 | 100 | 100 |
| Unequal Angular Arrangement | 87.7 | 94.6 | 86.3 | 91.4 | 99 | 65 | 44 |

As evident from Table 3, when the maximum torque of the conventional brushless motor is set to 100%, the maximum torque of the brushless motor 101 of the fifth embodiment is 99%, which is almost the same as the maximum torque of the conventional brushless motor. The change is subtle and the decrease is extremely small as compared with the torque decrease in the third and fourth embodiments.

When the minimum torque ripple of the conventional brushless motor is set to 100%, the minimum torque ripple of the brushless motor 101 of the fifth embodiment is 65%, which is extremely low. It is considered that the arrangement of the first to fourth permanent magnets M1 to M4, which are embedded at unequal angular intervals, greatly lowers the torque ripple from that of the conventional brushless motor.

When the minimum cogging torque of the conventional brushless motor (unequal angular arrangement) is set to 100%, the minimum cogging torque of the brushless motor 101 of the fifth embodiment is 44%, which is extremely lower than the minimum cogging torque of the conventional brushless motor. It is considered that the arrangement of the first to fourth permanent magnets M1 to M4, which are embedded at unequal angular intervals, greatly lowers the cogging torque from that of the conventional brushless motor.

The arrangement of the first to fourth permanent magnets M1 to M4 at unequal angular intervals causes changes in the magnetic flux density that are canceled out at each second magnetic pole portion 109. It is considered that this reduces the torque ripple and the cogging torque of the brushless motor.

It is considered that the decrease in the torque is small because the average magnetic flux subtly changes even when the first to fourth permanent magnets M1 to M4 are arranged at unequal angular intervals.

The fifth embodiment has the advantages described below.

(1) In the fifth embodiment, the first to fourth permanent magnets M1 to M4, which are embedded in the rotor core 107 of the brushless motor 101 sequentially in the rotation direction, are arranged at unequal angular intervals as viewed from the axis Lo.

In detail, the first to fourth permanent magnets M1 to M4 are arranged in the rotor core 107 of the brushless motor 101 in a manner that the first angle θ12 formed by the first permanent magnet M1 and the second permanent magnet M2 is 87.7 degrees, the second angle θ23 formed by the second permanent magnet M2 and the third permanent magnet M3 is 94.6 degrees, the third angle θ34 formed by the third permanent magnet M3 and the fourth permanent magnet M4 is 86.3 degrees, and the fourth angle θ41 formed by the fourth permanent magnet M4 and the first permanent magnet M1 is 91.4 degrees.

This reduces the torque ripple and the cogging torque while maintaining the torque characteristics of the conventional brushless motor (equal angular arrangement) including the asymmetrical clearances S1 and Sb. In particular, the motor with this structure reduces the cogging torque more from the brushless motor of the third and fourth embodiments.

A sixth embodiment of the present invention will now be described.

In the same manner as the rotors of the third to fifth embodiments, a rotor of the sixth embodiment is a consequent-pole rotor having an IPM structure in which permanent magnets are embedded in its rotor core.

The number of permanent magnets in the sixth embodiment is the same as the number of permanent magnets in the third to fifth embodiments, but the number of teeth of a stator of the sixth embodiment differs from the number of teeth of the stator in the third to fifth embodiments. Also, first to fourth permanent magnets M1 to M4 in the sixth embodiment are arranged at unequal angular intervals with its first to fourth angles θ12, θ23, θ34, and θ41 differing from the third to fifth embodiments.

Accordingly, items differing from the third to fifth embodiments will be described in detail, while items that are the same as the third to fifth embodiments will not be described for the sake of convenience.

Figure 14:
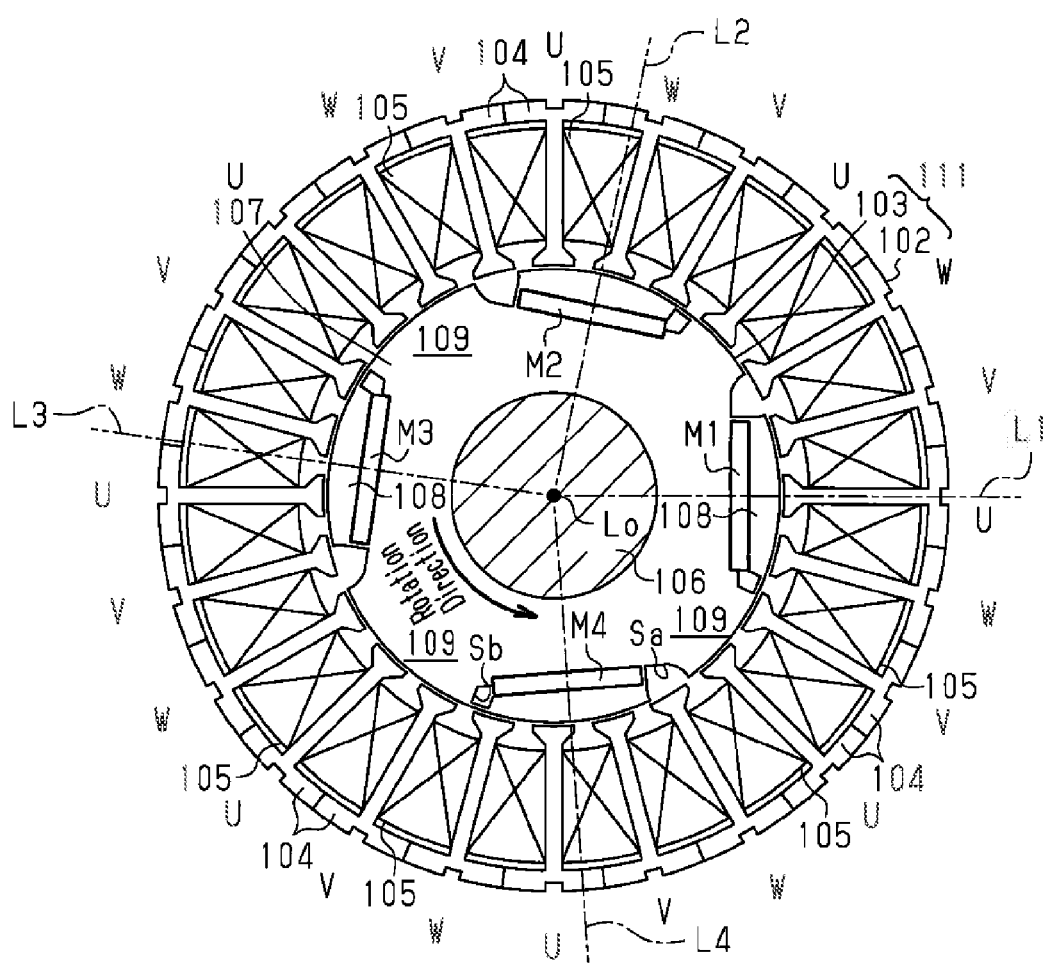
FIG. 14 is a view schematically showing the structure of a motor according to a sixth embodiment of the present invention.

FIG. 14 schematically shows the structure of a brushless motor 111 according to the sixth embodiment. As shown in FIG. 14, a stator 102 includes twenty four teeth 104. The twenty four teeth 104 are arranged annularly to form 24 slots between the teeth 104. A coil 105 is wound around each tooth 104 as a distributed winding. Three-phase alternating currents are supplied to the wound coil 105. The U, V, and W phase coils are sequentially arranged in the direction of rotation. The coil 105 of each phase is a distributed winding arranged at every three slots.

A rotor 103 includes a rotary shaft 106 and a cylindrical rotor core 107 that is fixed to the rotary shaft 106. Four planar permanent magnets, which are referred to as first to fourth permanent magnets M1 to M4, are arranged on the rotor core 107. The first to fourth permanent magnets M1 to M4 are arranged at predetermined angular intervals along the circumferential direction sequentially in the direction of rotation of the rotor core 107. The first to fourth permanent magnets M1 to M4 are embedded at positions near the outer circumferential surface of the rotor core 107

Each region in the outer circumferential surface of the rotor core 107 facing the magnetic pole faces of the embedded first to fourth permanent magnets M1 to M4 functions as a first magnetic pole portion 108. In the sixth embodiment, the four permanent magnets, or the first to fourth permanent magnets M1 to M4, are embedded. Thus, four first magnetic pole portions 108 are formed on the outer circumferential surface of the rotor core 107 by the first to fourth permanent magnets M1 to M4.

The first to fourth permanent magnets M1 to M4 are embedded in a manner so that the same pole faces (south poles in the present embodiment) are arranged at the radially outward side. As a result, the rotor 103 of the sixth embodiment includes the four first magnetic pole portions 108 having the same polarity (south poles) arranged at unequal angular intervals in the circumferential direction of the rotor.

On the rotor core 107, clearances Sa and Sb are formed at the two ends of each of the first to fourth permanent magnets M1 to M4 in the circumferential direction. The clearances Sa and Sb each function as magnetic resistor. As a result, the rotor core 107 includes four second magnetic pole portions 109 that are formed at location between the adjacent first magnetic pole portions 108 (the permanent magnets M1 to M4). The second magnetic pole portions 109 are magnetically separated from the first magnetic pole portions 108 in the circumferential direction. More specifically, a dummy magnetic pole (north pole) having a polarity differing from the adjacent first magnetic pole portion 108 is formed in each second magnetic pole portion 109.

The first to fourth permanent magnets M1 to M4 embedded in the rotor core 107 are arranged at unequal angular intervals as viewed from the axis Lo.

Figure 15:
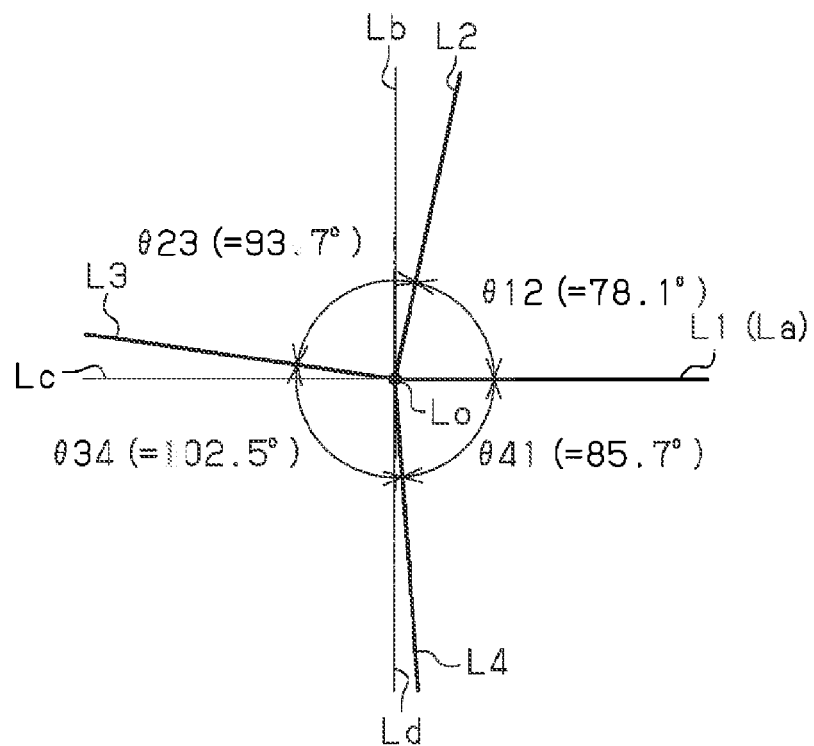
FIG. 15 is a diagram illustrating first to fourth permanent magnets that are arranged at unequal angular intervals in the motor shown in FIG. 14.

In the sixth embodiment, the first angle θ12 formed by a first center line L1 of the first permanent magnet M1 and a second center line L2 of the second permanent magnet M2, which is adjacent to the first permanent magnet M1 in the rotation direction, is 78.1 degrees as shown in FIG. 15.

The second angle θ23 formed by a second center line L2 of the second permanent magnet M2 and a third center line L3 of the third permanent magnet M3, which is adjacent to the second permanent magnet M2 in the rotation direction, is 93.7 degrees.

The third angle θ34 formed by a third center line L3 of the third permanent magnet M3 and a fourth center line L4 of the fourth permanent magnet M4, which is adjacent to the third permanent magnet M3 in the rotation direction, is 102.5 degrees.

The fourth angle θ41 formed by a fourth center line L4 of the fourth permanent magnet M4 and the first center line L1 of the first permanent magnet M1, which is adjacent to the fourth permanent magnet M4, in the rotation direction is 85.7 degrees.

The operation of the brushless motor 111 of the sixth embodiment will now be described by comparing the brushless motor 111 with a conventional brushless motor (equal angular arrangement).

The conventional brushless motor will now be described. As shown in FIG. 11, the conventional brushless motor differs from the brushless motor 111 of the sixth embodiment only in that first to fourth permanent magnets M1 to M4 are embedded in a rotor core 107 at equal angular intervals as viewed from the axis Lo. Otherwise, the structure of the conventional brushless motor is the same as the structure of the brushless motor 111 of the sixth embodiment.

An experiment was conducted by driving the brushless motor 111 of the sixth embodiment and the conventional brushless motor to produce rotation in the counterclockwise direction. Then, the torque, torque ripple, and cogging torque of the brushless motor 111 and the conventional brushless motor were compared.

Table 4 below shows the results.

TABLE 4

| | Angle (Degrees) | | | | Torque | Torque Ripple | Cogging Torque |
|---|---|---|---|---|---|---|---|
| | θ12 | θ23 | θ34 | θ41 | [%] | [%] | [%] |
| Equal Angular Arrangement | 90 | 90 | 90 | 90 | 100 | 100 | 100 |
| Unequal Angular Arrangement | 78.1 | 93.7 | 102.5 | 85.7 | 89 | 15 | 35 |

As evident from Table 4, when the maximum torque of the conventional brushless motor is set to 100%, the maximum torque of the brushless motor 111 of the sixth embodiment is 89%, which is slightly lower.

When the minimum torque ripple of the conventional brushless motor is set to 100%, the minimum torque ripple of the brushless motor 111 of the sixth embodiment is 15%, which is extremely low. It is considered that the arrangement of the first to fourth permanent magnets M1 to M4, which are embedded at unequal angular intervals, greatly lowers the torque ripple from that of the conventional brushless motor.

When the minimum cogging torque of the conventional brushless motor is set to 100%, the minimum cogging torque of the brushless motor 111 of the sixth embodiment is 35%, which is extremely low. It is considered that the arrangement of the first to fourth permanent magnets M1 to M4, which are embedded at unequal angular intervals, greatly lowers the cogging torque from that of the conventional brushless motor.

The arrangement of the first to fourth permanent magnets M1 to M4 at unequal angular intervals causes changes in the magnetic flux density that are canceled out at each second magnetic pole portion 109. It is considered that this reduces the torque ripple and the cogging torque.

It is considered that the decrease in the torque is small because the average magnetic flux subtly changes even when the first to fourth permanent magnets M1 to M4 are arranged at unequal angular intervals.

The sixth embodiment has the advantages described below.

(1) In the sixth embodiment, the first to fourth permanent magnets M1 to M4, which are embedded in the rotor core 107 of the brushless motor 111 sequentially in the rotation direction, are arranged at unequal angular intervals as viewed from the axis Lo.

In detail, the first to fourth permanent magnets M1 to M4 are arranged in the rotor core 107 of the brushless motor 111 in a manner that the first angle θ12 formed by the first permanent magnet M1 and the second permanent magnet M2 is 78.1 degrees, the second angle θ23 formed by the second permanent magnet M2 and the third permanent magnet M3 is 93.7 degrees, the third angle θ34 formed by the third permanent magnet M3 and the fourth permanent magnet M4 is 102.5 degrees, and the fourth angle θ41 formed by the fourth permanent magnet M4 and the first permanent magnet M1 is 85.7 degrees.

This reduces the torque ripple and the cogging torque while maintaining the torque characteristics of the conventional brushless motor (equal angular arrangement) including the asymmetrical clearances S1 and Sb.

A seventh embodiment of the present invention will now be described.

In the same manner as the rotor of the sixth embodiment, a rotor of the seventh embodiment is a consequent-pole rotor having an IPM structure in which permanent magnets are embedded in its rotor core. The number of stator teeth and the number of permanent magnets in the seventh embodiment are the same as those in the sixth embodiment. In the seventh embodiment, first to fourth permanent magnets M1 to M4 are arranged at unequal angular intervals with its first to fourth angles θ12, θ23, θ34, and θ41 differing from the sixth embodiment.

Accordingly, items differing from the sixth embodiments will be described in detail, while items that are the same as the sixth embodiments will not be described for the sake of convenience.

In a brushless motor 111 of the seventh embodiment, the first to fourth angles θ12, θ23, θ34, and θ41 differ from the motor of the sixth embodiment.

Figure 16:
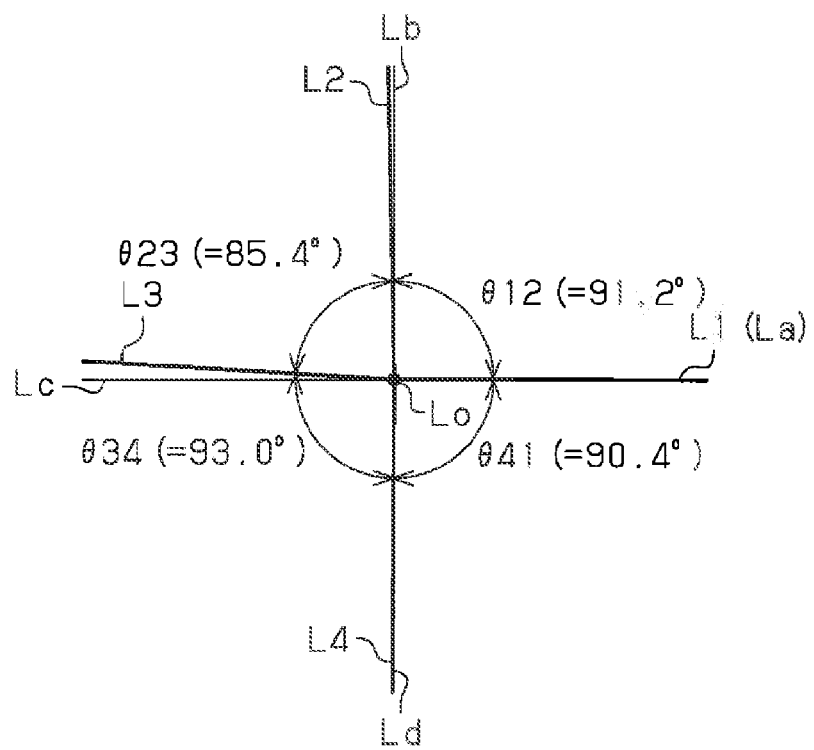
FIG. 16 is a diagram illustrating first to fourth permanent magnets that are arranged at unequal angular intervals in a motor according to a seventh embodiment of the present invention.

As shown in FIG. 16, the first angle θ12 formed by a first center line L1 of the first permanent magnet M1 and a second center line L2 of the second permanent magnet M2, which is adjacent to the first permanent magnet M1 in the rotation direction, is 91.2 degrees.

The second angle θ23 formed by a second center line L2 of the second permanent magnet M2 and a third center line L3 of the third permanent magnet M3, which is adjacent to the second permanent magnet M2 in the rotation direction, is 85.4 degrees.

The third angle θ34 formed by a third center line L3 of the third permanent magnet M3 and a fourth center line L4 of the fourth permanent magnet M4, which is adjacent to the third permanent magnet M3 in the rotation direction, is 93.0 degrees.

The fourth angle θ41 formed by a fourth center line L4 of the fourth permanent magnet M4 and the first center line L1 of the first permanent magnet M1, which is adjacent to the fourth permanent magnet M4 in the rotation direction, is 90.4 degrees.

An experiment was conducted by driving the brushless motor 111 of the seventh embodiment and the conventional brushless motor to produce rotation in the counterclockwise direction. Then, the torque, torque ripple, and cogging torque of the brushless motor 111 and the conventional brushless motor were compared.

Table 5 below shows the results.

TABLE 5

| | Angle (Degrees) | | | | Torque | Torque Ripple | Cogging Torque |
|---|---|---|---|---|---|---|---|
| | θ12 | θ23 | θ34 | θ41 | [%] | [%] | [%] |
| Equal Angular Arrangement | 90 | 90 | 90 | 90 | 100 | 100 | 100 |
| Unequal Angular Arrangement | 91.2 | 85.4 | 93.0 | 90.4 | 94 | 30 | 25 |

As evident from Table 5, when the maximum torque of the conventional brushless motor is set to 100%, the maximum torque of the brushless motor 111 of the seventh embodiment is 94%, which is slightly lower.

When the minimum torque ripple of the conventional brushless motor is set to 100%, the minimum torque ripple of the brushless motor 111 of the seventh embodiment is 30%, which is extremely low. It is considered that the arrangement of the first to fourth permanent magnets M1 to M4, which are embedded at unequal angular intervals, greatly lowers the torque ripple from that of the conventional brushless motor.

When the minimum cogging torque of the conventional brushless motor is set to 100%, the minimum cogging torque of the brushless motor 111 of the seventh embodiment is 25%, which is further lower than the sixth embodiment. It is considered that the arrangement of the first to fourth permanent magnets M1 to M4, which are embedded at unequal angular intervals, greatly lowers the cogging torque from that of the conventional brushless motor.

The arrangement of the first to fourth permanent magnets M1 to M4 at unequal angular intervals causes changes in the magnetic flux density that are canceled out at each second magnetic pole portion 109. It is considered that this reduces the torque ripple and the cogging torque.

It is considered that the decrease in the torque is small because the average magnetic flux subtly changes even when the first to fourth permanent magnets M1 to M4 are arranged at unequal angular intervals.

The seventh embodiment has the advantages described below.

(1) In the seventh embodiment, the first to fourth permanent magnets M1 to M4, which are embedded in the rotor core 107 of the brushless motor 111 sequentially in the rotation direction, are arranged at unequal angular intervals as viewed from the axis Lo.

In detail, the first to fourth permanent magnets M1 to M4 are arranged in the rotor core 107 of the brushless motor 111 in a manner that the first angle θ12 formed by the first permanent magnet M1 and the second permanent magnet M2 is 91.2 degrees, the second angle θ23 formed by the second permanent magnet M2 and the third permanent magnet M3 is 85.4 degrees, the third angle θ34 formed by the third permanent magnet M3 and the fourth permanent magnet M4 is 93.0 degrees, and the fourth angle θ41 formed by the fourth permanent magnet M4 and the first permanent magnet M1 is 90.4 degrees.

This reduces the torque ripple and the cogging torque while maintaining the torque characteristics of the conventional brushless motor (equal angular arrangement) including the asymmetrical clearances S1 and Sb. In particular, the cogging torque is further reduced from that of the brushless motor of the sixth embodiment.

An eighth embodiment of the present invention will now be described.

In the same manner as the rotors of the sixth and seventh embodiments, a rotor of the eighth embodiment is a consequent-pole rotor having an IPM structure in which permanent magnets are embedded in its rotor core. The number of stator teeth and the number of permanent magnets in the eighth embodiment are the same as those in the sixth and seventh embodiments. In the eighth embodiment, first to fourth permanent magnets M1 to M4 are arranged at unequal angular intervals with its first to fourth angles θ12, θ23, θ34, and θ41 differing from the sixth and seventh embodiments.

Accordingly, items differing from the sixth and seventh embodiments will be described in detail, while items that are the same as the sixth and seventh embodiments will not be described for the sake of convenience.

In a brushless motor 111 of the eighth embodiment, the first to fourth angles θ12, θ23, θ34, and θ41 differs from the motors of the sixth and seventh embodiments.

Figure 17:
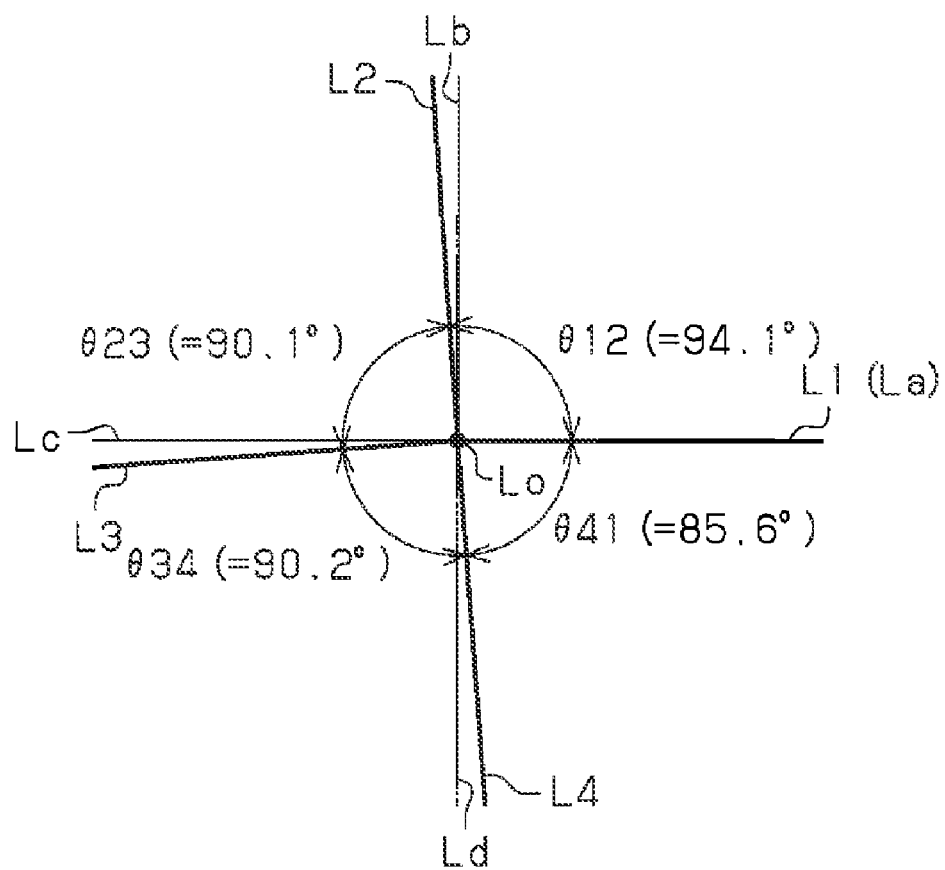
FIG. 17 is a diagram illustrating first to fourth permanent magnets that are arranged at unequal angular intervals in a motor according to an eighth seventh embodiment of the present invention.

As shown in FIG. 17, the first angle θ12 formed by a first center line L1 of the first permanent magnet M1 and a second center line L2 of the second permanent magnet M2, which is adjacent to the first permanent magnet M1 in the rotation direction, is 94.1 degrees.

The second angle θ23 formed by a second center line L2 of the second permanent magnet M2 and a third center line L3 of the third permanent magnet M3, which is adjacent to the second permanent magnet M2 in the rotation direction, is 90.1 degrees.

The third angle θ34 formed by a third center line L3 of the third permanent magnet M3 and a fourth center line L4 of the fourth permanent magnet M4, which is adjacent to the third permanent magnet M3 in the rotation direction, is 90.2 degrees.

The fourth angle θ41 formed by a fourth center line L4 of the fourth permanent magnet M4 and the first center line L1 of the first permanent magnet M1, which is adjacent to the fourth permanent magnet M4 in the rotation direction, is 85.6 degrees.

An experiment was conducted by driving the brushless motor 111 of the eighth embodiment and the conventional brushless motor (equal angular arrangement) to produce rotation in the counterclockwise direction. Then, the torque, torque ripple, and cogging torque of the brushless motor 111 and the conventional brushless motor were compared.

Table 6 below shows the results.

TABLE 6

| | Angle (Degrees) | | | | Torque [%] | Torque Ripple [%] | Cogging Torque [%] |
|---|---|---|---|---|---|---|---|
| | θ12 | θ23 | θ34 | θ41 | | | |
| Equal Angular Arrangement | 90 | 90 | 90 | 90 | 100 | 100 | 100 |
| Unequal Angular Arrangement | 94.1 | 90.1 | 90.2 | 85.6 | 99 | 70 | 62 |

As evident from Table 6, when the maximum torque of the conventional brushless motor is set to 100%, the maximum torque of the brushless motor 111 of the eighth embodiment is 99%, which is a subtle change.

When the minimum torque ripple of the conventional brushless motor is set to 100%, the minimum torque ripple of the brushless motor 111 of the eighth embodiment is 70%, which is extremely low. It is considered that the arrangement of the first to fourth permanent magnets M1 to M4, which are embedded at unequal angular intervals, greatly lowers the torque ripple from that of the conventional brushless motor.

When the minimum cogging torque of the conventional brushless motor is set to 100%, the minimum cogging torque of the brushless motor 111 of the eighth embodiment is 70%, which is extremely low. It is considered that the arrangement of the first to fourth permanent magnets M1 to M4, which are embedded at unequal angular intervals, greatly lowers the cogging torque from that of the conventional brushless motor.

The arrangement of the first to fourth permanent magnets M1 to M4 at unequal angular intervals causes changes in the magnetic flux density that are canceled out at each second magnetic pole portion 109. It is considered that this reduces the torque ripple and the cogging torque.

It is considered that the decrease in the torque is small because the average magnetic flux subtly changes even when the first to fourth permanent magnets M1 to M4 are arranged at unequal angular intervals.

The eighth embodiment has the advantages described below.

(1) In the eighth embodiment, the first to fourth permanent magnets M1 to M4, which are embedded in the rotor core 107 of the brushless motor 111 in the stated order in the rotation direction, are arranged at unequal angular intervals as viewed from the axis Lo.

In detail, the first to fourth permanent magnets M1 to M4 are arranged in the rotor core 107 of the brushless motor 111 in a manner that the first angle θ12 formed by the first permanent magnet M1 and the second permanent magnet M2 is 94.1 degrees, the second angle θ23 formed by the second permanent magnet M2 and the third permanent magnet M3 is 90.1 degrees, the third angle θ34 formed by the third permanent magnet M3 and the fourth permanent magnet M4 is 90.2 degrees, and the fourth angle θ41 formed by the fourth permanent magnet M4 and the first permanent magnet M1 is 85.6 degrees.

This reduces the torque ripple and the cogging torque while maintaining the torque characteristics of the conventional brushless motor (equal angular arrangement) including the asymmetrical clearances S1 and Sb. In particular, torque decrease is further suppressed compared with the sixth and seventh embodiments.

A ninth embodiment of the present invention will now be described.

In the same manner as the rotors of the third to eighth embodiments, a rotor of the ninth embodiment is a consequent-pole rotor having an IPM structure in which permanent magnets are embedded in its rotor core.

In the ninth embodiment, the number of stator teeth is 30 and the number of magnets is 5, which differ from the third to eighth embodiments. Accordingly, items differing from the third to eighth embodiments will be described in detail, while items that are the same as the third to eight embodiments will not be described for the sake of convenience.

Figure 18:
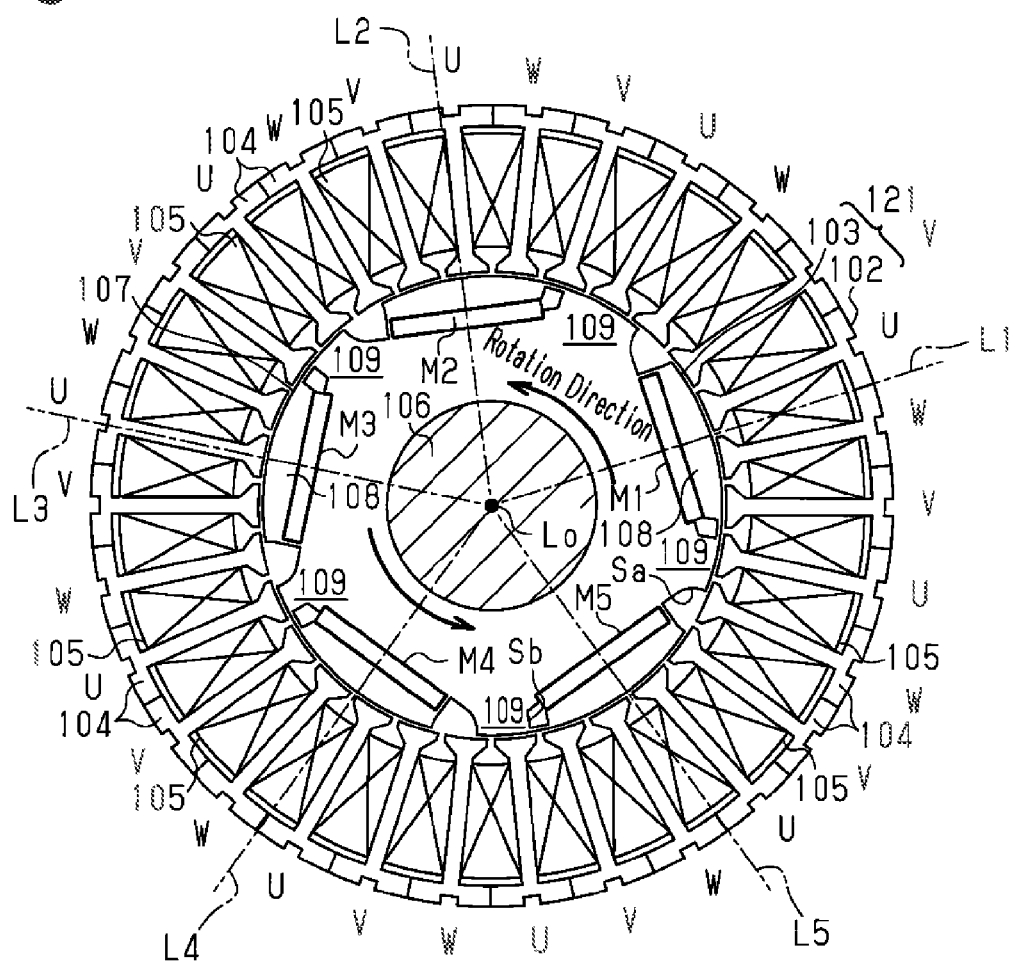
FIG. 18 schematically shows the structure of a motor according to a ninth seventh embodiment of the present invention.

FIG. 18 schematically shows the structure of a brushless motor 121 according to the ninth embodiment. As shown in FIG. 18, a stator 102 includes thirty teeth 104. The thirty teeth 104 are arranged annularly to form 30 slots between the teeth 104. A coil 105 is wound around each tooth 104 as a distributed winding. Three-phase alternating currents are supplied to the wound coil 105. The U, V, and W phase coils are sequentially arranged in the direction of rotation. The coil 105 of each phase is a distributed wiring arranged at every three slots.

A rotor 103 includes a rotary shaft 106 and a cylindrical rotor core 107 that is fixed to the rotary shaft 106. Five planar permanent magnets, which are referred to as first to fifth permanent magnets M1 to M5, are arranged on the rotor core 107. The first to fifth permanent magnets M1 to M5 are arranged at predetermined angular intervals in the circumferential direction sequentially in the direction of rotation of the rotor core 107. The first to fifth permanent magnets M1 to M5 are embedded at positions near the outer circumferential surface of the rotor core 107

Each region in the outer circumferential surface of the rotor core 107 facing the magnetic pole faces of the embedded first to fifth permanent magnets M1 to M5 functions as a first magnetic pole portion 108. In the ninth embodiment, the five permanent magnets, or the first to fifth permanent magnets M1 to M5, are embedded. Thus, five first magnetic pole portions 108 are formed on the outer circumferential surface of the rotor core 107 by the first to fifth permanent magnets M1 to M5.

The first to fifth permanent magnets M1 to M5 are embedded in a manner that the same pole faces (south poles in the present embodiment) are arranged at the radially outward side. As a result, the rotor 103 of the ninth embodiment includes the five first magnetic pole portions 108 having the same polarity (south poles) arranged at unequal angular intervals in the circumferential direction of the rotor.

On the rotor core 107, clearances S (Sa, Sb) are formed at the two ends of each of the first to fifth permanent magnets M1 to M5 in the circumferential direction. The clearances S each function as a magnetic resistor. As a result, the rotor core 107 includes five second magnetic pole portions 109 that are formed between the adjacent first magnetic pole portions 108 (the permanent magnets M1 to M5). The second magnetic pole portions 109 are magnetically separated from the first magnetic pole portions 108 in the circumferential direction. More specifically, a dummy magnetic pole (north pole) having a polarity differing from the adjacent first magnetic pole portion 108 is formed in each second magnetic pole portion 109.

The first to fifth permanent magnets M1 to M5 embedded in the rotor core 107 are arranged at unequal angular intervals as viewed from the axis Lo.

Figure 19:
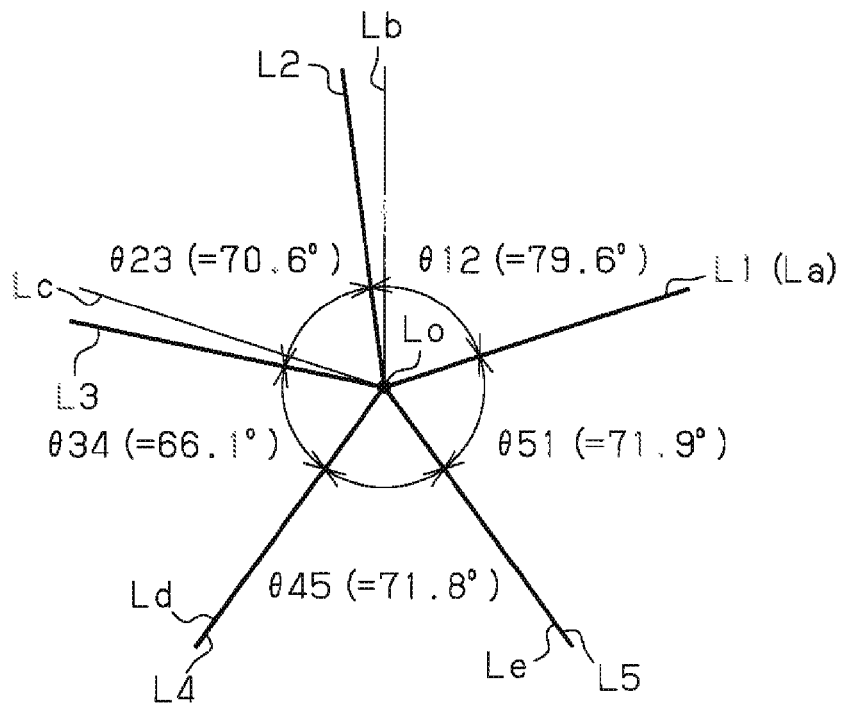
FIG. 19 is a diagram illustrating first to fifth permanent magnets that are arranged at unequal angular intervals in the motor shown in FIG. 18.

In the ninth embodiment, a first angle θ12 formed by a first center line L1 of the first permanent magnet M1 and a second center line L2 of the second permanent magnet M2, which is adjacent to the first permanent magnet M1 in the rotation direction, is 79.6 degrees as shown in FIG. 19.

A second angle θ23 formed by a second center line L2 of the second permanent magnet M2 and a third center line L3 of the third permanent magnet M3, which is adjacent to the second permanent magnet M2 in the rotation direction, is 70.6 degrees.

A third angle θ34 formed by a third center line L3 of the third permanent magnet M3 and a fourth center line L4 of the fourth permanent magnet M4, which is adjacent to the third permanent magnet M3 in the rotation direction, is 66.1 degrees.

A fourth angle θ45 formed by a fourth center line L4 of the fourth permanent magnet M4 and a fifth center line L1 of the fifth permanent magnet M5, which is adjacent to the fourth permanent magnet M4 in the rotation direction, is 71.8 degrees.

A fifth angle θ51 formed by a fifth center line L5 of the fifth permanent magnet M5 and the first center line L1 of the first permanent magnet M1, which is adjacent to the fifth permanent magnet M5 in the rotation direction, is 71.9 degrees.

The operation of the brushless motor 121 of the ninth embodiment will now be described by comparing the brushless motor 121 with a conventional brushless motor (equal angular arrangement).

Figure 20:
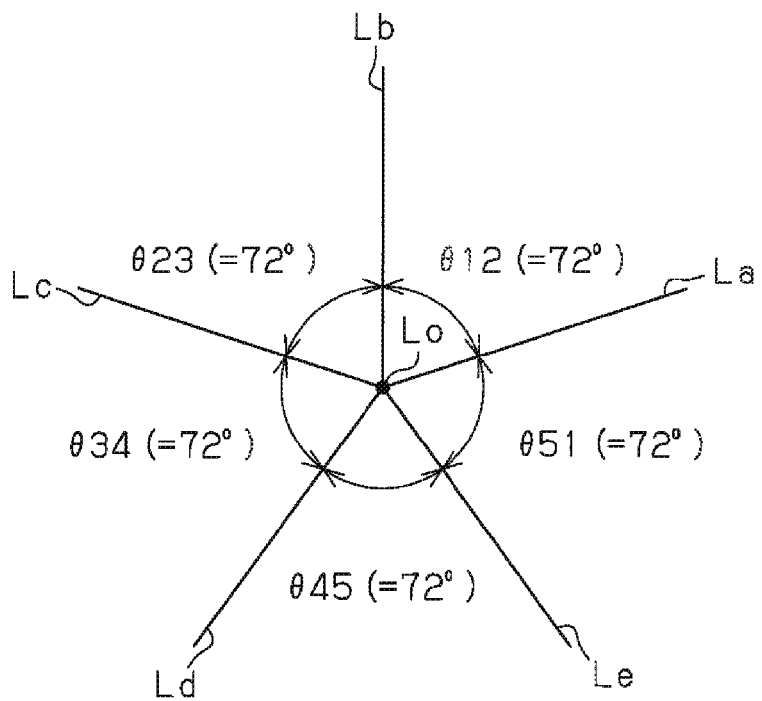
FIG. 20 is a diagram illustrating the arrangement interval of conventional first to fifth permanent magnets.

The conventional brushless motor will now be described. The conventional brushless motor differs from the brushless motor 121 of the ninth embodiment only in that first to fifth permanent magnets M1 to M5 are embedded in a rotor core at equal angular intervals as viewed from a axis Lo. Otherwise, the structure of the conventional brushless motor is the same as the structure of the brushless motor 121 of the ninth embodiment. As shown in FIG. 20, the conventional brushless motor (equal angular arrangement) is formed so that a first angle θ12, a second angle θ23, a third angle θ34, a fourth angle θ45, and a fifth angle θ51 are all 72 degrees.

In FIG. 20, a first base line La corresponds to the first center line L1 of the first permanent magnet M1 of the ninth embodiment, a second base line Lb to the second center line L2 of the second permanent magnet M2 of the ninth embodiment, a third base line Lc to the third center line L3 of the third permanent magnet M3 of the ninth embodiment, a fourth base line Ld to the fourth center line L4 of the fourth permanent magnet M4 of the ninth embodiment, and a fifth base line Le to the fifth center line L5 of the fifth permanent magnet M5 of the ninth embodiment.

An experiment was conducted by driving the brushless motor 121 of the ninth embodiment and the conventional brushless motor (equal angular arrangement) to produce rotation in the counterclockwise direction. Then, the torque, torque ripple, and cogging torque of the brushless motor 121 and the conventional brushless motor were compared.

Table 7 below shows the results.

As evident from Table 7, when the maximum torque of the conventional brushless motor is set to 100%, the maximum torque of the brushless motor 121 of the ninth embodiment is 95%, which is slightly lower.

When the minimum torque ripple of the conventional brushless motor is set to 100%, the minimum torque ripple of the brushless motor 121 of the ninth embodiment is 33%, which is extremely low. It is considered that the arrangement of the first to fifth permanent magnets M1 to M5, which are embedded at unequal angular intervals, greatly lowers the torque ripple from that of the conventional brushless motor.

When the minimum cogging torque of the conventional brushless motor is set to 100%, the minimum cogging torque of the brushless motor 121 of the ninth embodiment is 42%, which is extremely low. It is considered that the arrangement of the first to fifth permanent magnets M1 to M5, which are embedded at unequal angular intervals, greatly lowers the cogging torque from that of the conventional brushless motor.

The arrangement of the first to fifth permanent magnets M1 to M5 at unequal angular intervals causes changes in the magnetic flux density that are canceled out at each second magnetic pole portion 109. It is considered that this reduces the torque ripple and cogging torque.

It is considered that the decrease in the torque is small because the average magnetic flux subtly changes even when the first to fifth permanent magnets M1 to M5 are arranged at unequal angular intervals.

The ninth embodiment has the advantages described below.

(1) In the ninth embodiment, the first to fifth permanent magnets M1 to M5, which are embedded in the rotor core 107 of the brushless motor 121 sequentially in the rotation direction, are arranged at unequal angular intervals as viewed from the axis Lo.

In detail, the first to fifth permanent magnets M1 to M5 are arranged in the rotor core 107 of the brushless motor 121 in a manner that the first angle θ12 formed by the first permanent magnet M1 and the second permanent magnet M2 is 79.6 degrees, the second angle θ23 formed by the second permanent magnet M2 and the third permanent magnet M3 is 70.6 degrees, the third angle θ34 formed by the third permanent magnet M3 and the fourth permanent magnet M4 is 66.1 degrees, the fourth angle θ45 formed by the fourth permanent magnet M4 and the fifth permanent magnet M5 is 71.8 degrees, and the fifth angle θ51 formed by the fifth permanent magnet M5 and the first permanent magnet M1 is 71.9 degrees.

This reduces the torque ripple and the cogging torque while maintaining the torque characteristics of the conventional brushless motor (equal angular arrangement) including the asymmetrical clearances S1 and Sb.

A tenth embodiment of the present invention will now be described.

In the same manner as rotor of the ninth embodiment, a rotor of the tenth embodiment is a consequent-pole rotor having an IPM structure in which permanent magnets are embedded in its rotor core. The number of stator teeth and the number of permanent magnets in the tenth embodiment are the same as those in the ninth embodiment. In the tenth embodiment, first to fifth permanent magnets M1 to M5 are arranged at unequal angular intervals with its first to fourth angles θ12, θ23, θ34, θ45, and θ51 differing from the ninth embodiment.

TABLE 7

|  | Angle [Degrees] | | | | | Torque [%] | Torque Ripple [%] | Cogging Torque [%] |
| --- | --- | --- | --- | --- | --- | --- | --- | --- |
|  | θ12 | θ23 | θ34 | θ45 | θ51 | | | |
| Equal Angular Arrangement | 72 | 72 | 72 | 72 | 72 | 100 | 100 | 100 |
| Unequal Angular Arrangement | 79.6 | 70.6 | 66.1 | 71.8 | 71.9 | 95 | 33 | 42 |

Accordingly, items differing from the ninth embodiment will be described in detail, while items that are the same as the ninth embodiment will not be described for the sake of convenience.

A brushless motor 121 of the tenth embodiment differs from the motor of the ninth embodiment in its first to fifth angles $\theta12$, $\theta23$, $\theta34$, $\theta45$, and $\theta51$.

Figure 21:
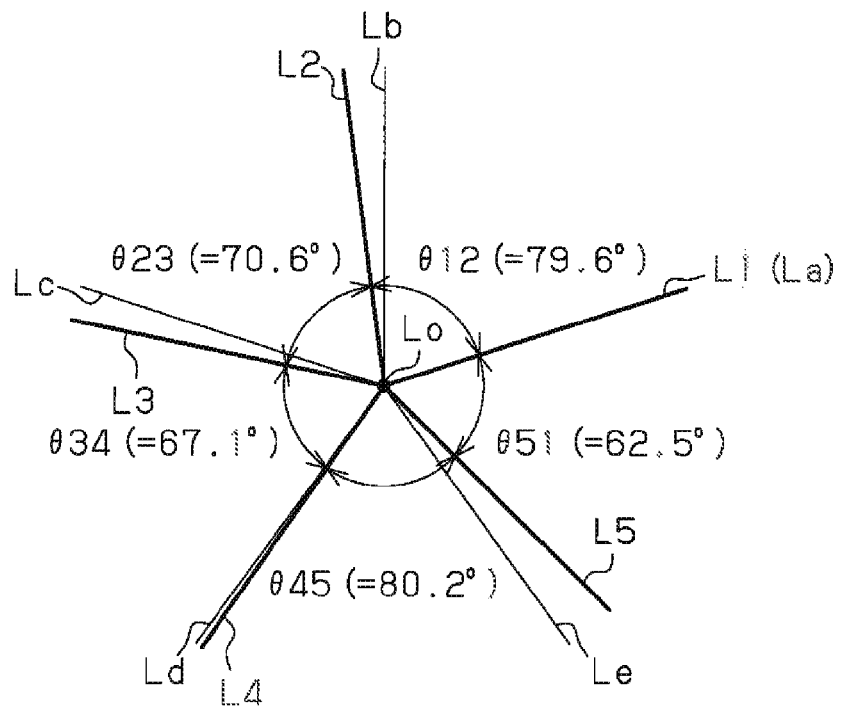
FIG. 21 is a diagram illustrating first to fifth permanent magnets that are arranged at unequal angular intervals in a motor according to a tenth embodiment of the present invention.

As shown in FIG. 21, the first angle $\theta12$ formed by a first center line L1 of the first permanent magnet M1 and a second center line L2 of the second permanent magnet M2, which is adjacent to the first permanent magnet M1 in the rotation direction, is 79.6 degrees.

The second angle $\theta23$ formed by a second center line L2 of the second permanent magnet M2 and a third center line L3 of the third permanent magnet M3, which is adjacent to the second permanent magnet M2 in the rotation direction, is 70.6 degrees.

The third angle $\theta34$ formed by a third center line L3 of the third permanent magnet M3 and a fourth center line L4 of the fourth permanent magnet M4, which is adjacent to the third permanent magnet M3 in the rotation direction, is 67.1 degrees.

The fourth angle $\theta45$ formed by a fourth center line L4 of the fourth permanent magnet M4 and a fifth center line L5 of the fifth permanent magnet M5, which is adjacent to the fourth permanent magnet M4 in the rotation direction, is 80.2 degrees.

The fifth angle $\theta51$ formed by a fifth center line L5 of the fifth permanent magnet M5 and the first center line L1 of the first permanent magnet M1, which is adjacent to the fifth permanent magnet M5 in the rotation direction is 62.5 degrees.

An experiment was conducted by driving the brushless motor 121 of the tenth embodiment and the conventional brushless motor (equal angular arrangement) to produce rotation in the counterclockwise direction. Then, the torque, torque ripple, and cogging torque of the brushless motor 121 and the conventional brushless motor were compared.

Table 8 below shows the results.

TABLE 8

| | Angle [Degrees] | | | | Torque [%] | Torque Ripple [%] | Cogging Torque [%] |
|---|---|---|---|---|---|---|---|
| | $\theta12$ | $\theta23$ | $\theta34$ | $\theta45$ | $\theta51$ | | | |
| Equal Angular Arrangement | 72 | 72 | 72 | 72 | 72 | 100 | 100 | 100 |
| Unequal Angular Arrangement | 79.6 | 70.6 | 67.1 | 80.2 | 62.5 | 92 | 30 | 20 |

As evident from Table 8, when the maximum torque of the conventional brushless motor is set to 100%, the maximum torque of the brushless motor 121 of the tenth embodiment is 92%, which is slightly lower.

When the minimum torque ripple of the conventional brushless motor is set to 100%, the minimum torque ripple of the brushless motor 121 of the tenth embodiment is 30%, which is extremely low. It is considered that the arrangement of the first to fifth permanent magnets M1 to M5, which are embedded at unequal angular intervals, greatly lowers the torque ripple from that of the conventional brushless motor.

When the minimum cogging torque of the conventional brushless motor is set to 100%, the minimum cogging torque of the brushless motor 121 of the tenth embodiment is 20%, which is further lower than the minimum cogging torque of the brushless motor of the ninth embodiment. It is considered that the arrangement of the first to fifth permanent magnets M1 to M5, which are embedded at unequal angular intervals, greatly lowers the cogging torque of the brushless motor from the cogging torque of the ninth embodiment.

The arrangement of the first to fifth permanent magnets M1 to M5 at unequal angular intervals causes changes in the magnetic flux density that are canceled out at each second magnetic pole portion 109. It is considered that this reduces the torque ripple and cogging torque.

It is considered that the decrease in the torque is small because the average magnetic flux subtly changes even when the first to fifth permanent magnets M1 to M5 are arranged at unequal angular intervals.

The tenth embodiment has the advantages described below.

(1) In the tenth embodiment, the first to fifth permanent magnets M1 to M5, which are embedded in the rotor core 107 of the brushless motor 121 sequentially in the rotation direction, are arranged at unequal angular intervals as viewed from the axis Lo.

In detail, the first to fifth permanent magnets M1 to M5 are arranged in the rotor core 107 of the brushless motor 121 in a manner that the first angle $\theta12$ formed by the first permanent magnet M1 and the second permanent magnet M2 is 79.6 degrees, the second angle $\theta23$ formed by the second permanent magnet M2 and the third permanent magnet M3 is 70.6 degrees, the third angle $\theta34$ formed by the third permanent magnet M3 and the fourth permanent magnet M4 is 67.1 degrees, the fourth angle $\theta45$ formed by the fourth permanent magnet M4 and the fifth permanent magnet M5 is 80.2 degrees, and the fifth angle $\theta51$ formed by the fifth permanent magnet M5 and the first permanent magnet M1 is 62.5 degrees.

This reduces the torque ripple and the cogging torque while maintaining the torque characteristics of the conventional brushless motor (equal angular arrangement) including the asymmetrical clearances S1 and Sb. In particular, the cogging torque is further reduced from the ninth embodiment.

An eleventh embodiment of the present invention will now be described.

In the same manner as the rotors of the ninth and tenth embodiments, a rotor of the eleventh embodiment is a consequent-pole rotor having an IPM structure in which permanent magnets are embedded in its rotor core. The number of stator teeth and the number of permanent magnets in the eleventh embodiment are the same as those in the ninth and tenth embodiments. In the eleventh embodiment, first to fifth permanent magnets M1 to M5 are arranged at unequal angular intervals with its first to fifth angles $\theta12$, $\theta23$, $\theta34$, $\theta45$, and $\theta51$ differing from the ninth and tenth embodiments.

Accordingly, items differing from the ninth and tenth embodiments will be described in detail, while items that are the same as the ninth embodiment will not be described for the sake of convenience.

A brushless motor 121 of the eleventh embodiment differs from the ninth and tenth embodiments in its first to fifth angles $\theta12$, $\theta23$, $\theta34$, $\theta45$, and $\theta51$.

Figure 22:
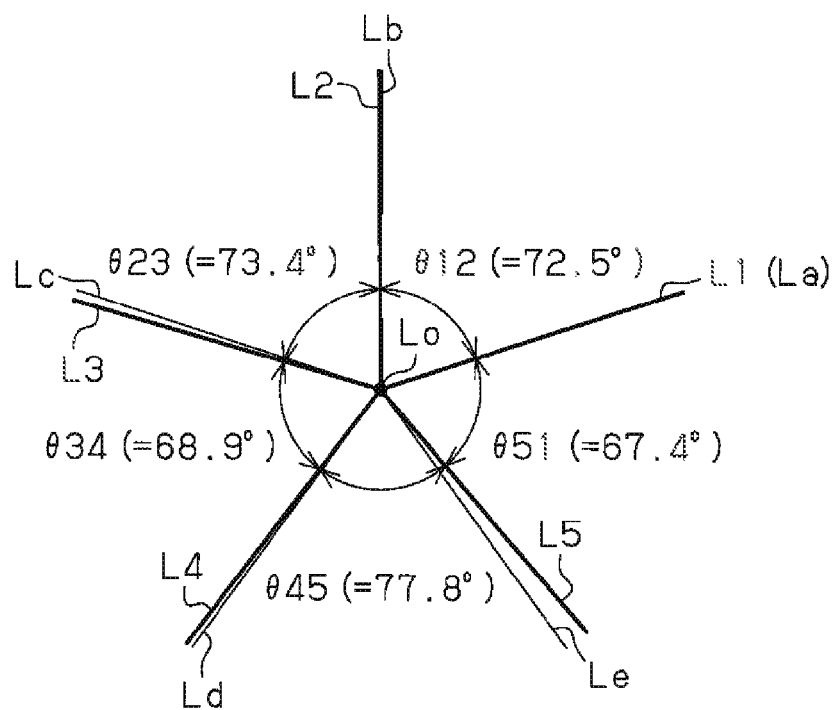
FIG. 22 is a diagram illustrating first to fifth permanent magnets that are arranged at unequal angular intervals in a motor according to an eleventh embodiment of the present invention.

As shown in FIG. 22, the first angle $\theta12$ formed by a first center line L1 of the first permanent magnet M1 and a second center line L2 of the second permanent magnet M2, which is adjacent to the first permanent magnet M1 in the rotation direction, is 72.5 degrees.

The second angle θ23 formed by a second center line L2 of the second permanent magnet M2 and a third center line L3 of the third permanent magnet M3, which is adjacent to the second permanent magnet M2 in the rotation direction, is 73.4 degrees.

The third angle θ34 formed by a third center line L3 of the third permanent magnet M3 and a fourth center line L4 of the fourth permanent magnet M4, which is adjacent to the third permanent magnet M3 in the rotation direction, is 68.9 degrees.

The fourth angle θ45 formed by a fourth center line L4 of the fourth permanent magnet M4 and a fifth center line L5 of the fifth permanent magnet M5, which is adjacent to the fourth permanent magnet M4 in the rotation direction, is 77.8 degrees.

The fifth angle θ51 formed by a fifth center line L5 of the fifth permanent magnet M5 and the first center line L1 of the first permanent magnet M1, which is adjacent to the fifth permanent magnet M5 in the rotation direction, is 67.4 degrees.

An experiment was conducted by driving the brushless motor 121 of the eleventh embodiment and the conventional brushless motor (equal angular arrangement) to produce rotation in the counterclockwise direction. Then, the torque, torque ripple, and cogging torque of the brushless motor 121 and the conventional brushless motor were compared.

Table 9 below shows the results.

It is considered that the decrease in the torque is small because the average magnetic flux subtly changes even when the first to fifth permanent magnets M1 to M5 are arranged at unequal angular intervals.

The eleventh embodiment has the advantages described below.

(1) In the eleventh embodiment, the first to fifth permanent magnets M1 to M4, which are embedded in the rotor core 107 of the brushless motor 121 sequentially in the rotation direction, are arranged at unequal angular intervals as viewed from the axis Lo.

In detail, the first to fifth permanent magnets M1 to M5 are arranged in the rotor core 107 of the brushless motor 121 in a manner that the first angle θ12 formed by the first permanent magnet M1 and the second permanent magnet M2 is 72.5 degrees, the second angle θ23 formed by the second permanent magnet M2 and the third permanent magnet M3 is 73.4 degrees, the third angle θ34 formed by the third permanent magnet M3 and the fourth permanent magnet M4 is 68.9 degrees, the fourth angle θ41 formed by the fourth permanent magnet M4 and the fifth permanent magnet M5 is 77.8 degrees, and the fifth angle θ51 formed by the fifth permanent magnet M5 and the first permanent magnet M1 is 67.4 degrees.

This reduces the torque ripple and the cogging torque while maintaining the torque characteristics of the conventional brushless motor (equal angular arrangement) including the asymmetrical clearances S1 and Sb. In particular, torque decrease is further suppressed compared with the ninth and tenth embodiments.

TABLE 9

| | Angle [Degrees] | | | | | Torque [%] | Torque Ripple [%] | Cogging Torque [%] |
| --- | --- | --- | --- | --- | --- | --- | --- | --- |
| | θ12 | θ23 | θ34 | θ45 | θ51 | | | |
| Equal Angular Arrangement | 72 | 72 | 72 | 72 | 72 | 100 | 100 | 100 |
| Unequal Angular Arrangement | 72.5 | 73.4 | 68.9 | 77.8 | 67.4 | 98 | 60 | 71 |

As evident from Table 9, when the maximum torque of the conventional brushless motor is set to 100%, the maximum torque of the brushless motor 121 of the eleventh embodiment is 98%, which is a subtle change. The decrease is extremely small when compared with the ninth and tenth embodiments.

When the minimum torque ripple of the conventional brushless motor is set to 100%, the minimum torque ripple of the brushless motor 121 of the eleventh embodiment is 60%, which is extremely low. It is considered that the arrangement of the first to fifth permanent magnets M1 to M5, which are embedded at unequal angular intervals, greatly lowers the torque ripple from that of the conventional brushless motor.

When the minimum cogging torque of the conventional brushless motor is set to 100%, the minimum cogging torque of the brushless motor 121 of the eleventh embodiment is 71%, which is extremely lower than the minimum cogging torque of the conventional brushless motor. It is considered that the arrangement of the first to fifth permanent magnets M1 to M5, which are embedded at unequal angular intervals, greatly lowers the cogging torque of the brushless motor from the cogging torque of the ninth embodiment.

The arrangement of the first to fifth permanent magnets M1 to M5 at unequal angular intervals causes changes in the magnetic flux density that are canceled out at each second magnetic pole portion 109. It is considered that this reduces the torque ripple and cogging torque.

The above embodiments may be modified in the following manners.

In the third embodiment, the first to fourth permanent magnets M1 to M4 are arranged in the rotor core 107 of the brushless motor 101 in a manner that the first angle θ12 is 81 degrees, the second angle θ23 is 94.5 degrees, the third angle θ34 is 86.4 degrees, and the fourth angle θ41 is 98.1 degrees. This reduces the torque ripple and the cogging torque and is particularly advantageous in reducing the torque ripple as compared with the fourth and fifth embodiments. However, the present invention is not limited in such a manner.

For example, the first to fourth angles θ12, θ23, θ34, and θ41 may be set so that the angular intervals increase in the order of the first angle θ12, the third angle θ34, the second angle θ23, and the fourth angle θ41 under the condition that the second angle θ23 is greater than 90 degrees and the third angle θ34 is less than 90 degrees. This also reduces the torque ripple while maintaining the torque characteristics.

In the fourth embodiment, the first to fourth permanent magnets M1 to M4 are arranged in the rotor core 107 of the brushless motor 101 so that the first angle θ12 is 103.1 degrees, the second angle θ23 is 83.3 degrees, the third angle θ34 is 86.4 degrees, and the fourth angle θ41 is 87.2 degrees. This reduces the torque ripple and the cogging torque while maintaining the torque characteristics, and is particularly advantageous in reducing the cogging torque as compared with the third and fifth embodiments. However, the present invention is not limited in such a manner.

For example, the first to fourth angles θ12, θ23, θ34, and θ41 may be set to increase in the order of the second angle θ23, the third angle θ34, the fourth angle θ41, and the first angle θ12 under the condition that the first angle θ12 is greater than 90 degrees and the fourth angle θ41 is less than 90 degrees. This also reduces the cogging torque while maintaining the torque characteristics.

In the fifth embodiment, the first to fourth permanent magnets M1 to M4 are arranged in the rotor core 107 of the brushless motor 101 so that the first angle θ12 is 87.7 degrees, the second angle θ23 is 94.6 degrees, the third angle θ34 is 86.3 degrees, and the fourth angle θ41 is 91.4 degrees. This reduces the torque ripple and the cogging torque while maintaining the torque characteristics, and is particularly advantageous in improving the torque characteristics as compared with the third and fourth embodiments. However, the present invention is not limited in such a manner.

For example, the first to fourth angles θ12, θ23, θ34, and θ41 may be set to increase in the order of the third angle θ34, the first angle θ12, the fourth angle θ41, and the second angle θ23 under the condition that the fourth angle θ41 is greater than 90 degrees and the first angle θ12 is less than 90 degrees. This also reduces the torque ripple and the cogging torque while improving the torque characteristics.

In the sixth embodiment, the first to fourth permanent magnets M1 to M4 are arranged in the rotor core 107 of the brushless motor 111 in a manner that the first angle θ12 is 78.1 degrees, the second angle θ23 is 93.7 degrees, the third angle θ34 is 102.5 degrees, and the fourth angle θ41 is 85.7 degrees. This reduces the torque ripple and the cogging torque while maintaining the torque characteristics, and is particularly advantageous in reducing the torque ripple as compared with the seventh and eighth embodiments. However, the present invention is not limited in such a manner.

For example, the first to fourth angles θ12, θ23, θ34, and θ41 may be set to increase in the order of the first angle θ12, the fourth angle θ41, the second angle θ23, and the third angle θ34 under the condition that the second angle θ23 is greater than 90 degrees and the fourth angle θ41 is less than 90 degrees. This also reduces the torque ripple while maintaining the torque characteristics.

In the seventh embodiment, the first to fourth permanent magnets M1 to M4 are arranged in the rotor core 107 of the brushless motor 111 so that the first angle θ12 is 91.2 degrees, the second angle θ23 is 85.4 degrees, the third angle θ34 is 93.0 degrees, and the fourth angle θ41 is 90.4 degrees. This reduces the torque ripple and the cogging torque while maintaining the torque characteristics, and is particularly advantageous in reducing the cogging torque as compared with the structures of the sixth and eighth embodiments. However, the present invention is not limited in such a manner.

For example, the first to fourth angles θ12, θ23, θ34, and θ41 may be set to increase in the order of the second angle θ23, the fourth angle θ41, the first angle θ12, and the third angle θ34 under the condition that the fourth angle θ41 is greater than 90 degrees and the second angle θ23 is less than 90 degrees. This reduces the cogging torque while maintaining the torque characteristics.

In the eighth embodiment, the first to fourth permanent magnets M1 to M4 are arranged in the rotor core 107 of the brushless motor 111 so that the first angle θ12 is 94.1 degrees, the second angle θ23 is 90.1 degrees, the third angle θ34 is 90.2 degrees, and the fourth angle θ41 is 85.6 degrees. This reduces the torque ripple and the cogging torque while maintaining the torque characteristics, and is particularly advantageous in improving the torque characteristics as compared with the sixth and seventh embodiments. However, the present invention is not limited in such a manner.

For example, the first to fourth angles θ12, θ23, θ34, and θ41 may be set to increase in the order of the fourth angle θ41, the second angle θ23, the third angle θ34, and the first angle θ12 under the condition that the second angle θ23 is greater than 90 degrees and the fourth angle θ41 is less than 90 degrees. This reduces the torque ripple and the cogging torque while improving the torque characteristics.

In the ninth embodiment, the first to fifth permanent magnets M1 to M5 are arranged in the rotor core 107 of the brushless motor 121 so that the first angle θ12 is 79.6 degrees, the second angle θ23 is 70.6 degrees, the third angle θ34 is 66.1 degrees, the fourth angle θ45 is 71.8 degrees, and the fifth angle θ51 is 71.9 degrees. This reduces the torque ripple and the cogging torque while maintaining the torque characteristics, and is particularly advantageous in reducing the torque ripple as compared with the tenth and eleventh embodiments. However, the present invention is not limited in such a manner.

For example, the first to fifth angles θ12, θ23, θ34, θ45, and θ51 may be set to increase in the order of the third angle θ34, the second angle θ23, the fourth angle θ45, the fifth angle θ51, and the first angle θ12 under the condition that the first angle θ12 is greater than 72 degrees and the fifth angle θ51 is less than 72 degrees. This also reduces the torque ripple while maintaining the torque characteristics.

In the tenth embodiment, the first to fifth permanent magnets M1 to M5 are arranged in the rotor core 107 of the brushless motor 121 so that the first angle θ12 is 79.6 degrees, the second angle θ23 is 70.6 degrees, the third angle θ34 is 67.1 degrees, the fourth angle θ45 is 80.2 degrees, and the fifth angle θ51 is 62.5 degrees. This structure reduces the torque ripple and the cogging torque while maintaining the torque characteristics, and is particularly advantageous in reducing the cogging torque as compared with the ninth and eleventh embodiments. However, the present invention is not limited in such a manner.

For example, the first to fifth angles θ12, θ23, θ34, 045, and θ51 may be set to increase in the order of the fifth angle θ51, the third angle θ34, the second angle θ23, the first angle θ12, and the fourth angle θ45 under the condition that the first angle θ12 is greater than 72 degrees and the second angle θ23 is less than 72 degrees. This also reduces the cogging torque while maintaining the torque characteristics.

In the eleventh embodiment, the first to fifth permanent magnets M1 to M5 are arranged in the rotor core 107 of the brushless motor 121 so that the first angle θ12 is 72.5 degrees, the second angle θ23 is 73.4 degrees, the third angle θ34 is 68.9 degrees, the fourth angle θ45 is 77.8 degrees, and the fifth angle θ51 is 67.4 degrees. This reduces the torque ripple and the cogging torque while maintaining the torque characteristics, and is particularly advantageous in improving the torque characteristics as compared with the eighth and tenth embodiments. However, the present invention is not limited in such a manner.

For example, the first to fifth angles θ12, θ23, θ34, θ45, and θ51 may be set so to increase in the order of the fifth angle θ51, the third angle θ34, the first angle θ12, the second angle θ23, and the fourth angle θ45 under the condition that the first angle θ12 is greater than 72 degrees and the third angle θ34 is less than 72 degrees.

This also improves the torque characteristics while reducing the torque ripple and the cogging torque.

In the third to eleventh embodiments, the permanent magnets M1 to M5 are arranged to that the magnetic pole faces at the radially outward side are south poles. The present invention is not limited in such a manner. The permanent magnets M1 to M5 may be arranged so that the magnetic pole faces at the radially outward side are north poles.

In the third to eleventh embodiments, the permanent magnets M1 to M5 are formed by planar permanent magnets. Alternatively, the permanent magnets M1 to M5 may be formed by curved permanent magnets.

The third to fifth embodiments each describe the brushless motor 101 that includes the stator 102 including the twelve teeth 104 and the rotor 103 including the four permanent magnets M1 to M4. The sixth to eighth embodiments each describe the brushless motor 111 that includes the stator 102 including the twenty four teeth 104 and the rotor 103 including the four permanent magnets M1 to M4. The ninth and tenth embodiments each describe the brushless motor 121 that includes the stator 102 including the thirty teeth 104 and the rotor 103 including the five permanent magnets M1 to M5. However, the present invention is not limited in such a manner. The number of teeth and the number of permanent magnets is not limited as long as the rotary motor includes a consequent type rotor with an IPM structure.

What is claimed is:

1. A motor comprising:
   a stator including a stator core, which has a plurality of teeth, and a plurality of coils, which are wound around the teeth;
   a rotor including a rotor core, which faces toward the stator, a plurality of magnets, which are arranged on the rotor core in a circumferential direction of the rotor core and function as first magnetic poles, and salient poles, which are formed integrally with the rotor core, with each of the salient poles being arranged between adjacent ones of the magnets and spaced apart by a clearance from the magnets, and the salient poles functioning as second magnetic poles that differ from the first magnetic poles; and
   a current supply unit that supplies three-phase excitation currents to the plurality of coils to drive and rotate the rotor;
   wherein when P represents the number of poles in the rotor and S represents the number of coils, a ratio P/S of the pole number P and the coil number S is represented by $(4n-2)/3m$ (where n and m are integers that are greater than or equal to 2, and S is not equal to P);
   the plurality of coils include a plurality of coil groups including coils for three phases;
   the plurality of coils include first coil groups for three phases and second coil groups for three phases, the first coil group of each phase includes coils of the same phase having different winding directions and facing toward each other in a radial direction, the second coil group of each phase includes coils of the same phase having different winding directions and facing toward each other in a radial direction, and the second coil group of each phase arranged adjacent in the circumferential direction to a first coil group of the same phase so that adjacent coils of the same phase have different winding directions; and
   the current supply unit executes different current control on the first coil groups and second coil groups so as to set a phase difference θ in an energized state between the first and second coil groups so as to satisfy $0°<θ≦2×|180°×(ratio\ P/S-1)|$.

2. The motor according to claim 1, wherein the ratio P/S of the pole number P and the coil number S is represented by $(12k±2)/12k$ (where k is a positive integer).

3. The motor according to claim 1, wherein the current supply unit sets a phase difference θ in an energized state between the first and second coil groups so as to satisfy $0.5×|180°×(ratio\ P/S-1)|≦θ≦1.5×|180°×(ratio\ P/S-1)|$.

4. The motor according to claim 1, wherein the coil number S of the stator is twelve, and the pole number P of the rotor is ten or fourteen; and
   the current supply unit sets a phase difference θ in an energized state between the first and second coil groups to 30°.

* * * * *